United States Patent
Rao

(10) Patent No.: US 9,470,795 B2
(45) Date of Patent: Oct. 18, 2016

(54) TIME TO FIRST FIX OPTIMIZATION IN A SATELLITE NAVIGATION RECEIVER

(71) Applicant: Accord Software & Systems Pvt Ltd, Bangalore (IN)

(72) Inventor: Vyasaraj Guru Rao, Bangalore (IN)

(73) Assignee: ACCORD SOFTWARE & SYSTEMS PVT LTD., Bangalore, Karnataka (IN)

( * ) Notice: Subject to any disclaimer, the term of this patent is extended or adjusted under 35 U.S.C. 154(b) by 446 days.

(21) Appl. No.: 14/102,500

(22) Filed: Dec. 11, 2013

(65) Prior Publication Data

US 2015/0077288 A1    Mar. 19, 2015

(30) Foreign Application Priority Data

Sep. 17, 2013  (IN) ............................ 4162/CHE/2013

(51) Int. Cl.
*G01S 19/07* (2010.01)
*G01S 19/05* (2010.01)

(52) U.S. Cl.
CPC ................ *G01S 19/07* (2013.01); *G01S 19/05* (2013.01)

(58) Field of Classification Search
CPC ................................. G01S 19/09; G01S 19/31
USPC .............. 342/357.4, 357.46, 357.51, 357.63, 342/357.71; 375/142, 150
See application file for complete search history.

(56) References Cited

U.S. PATENT DOCUMENTS

2002/0142783 A1   10/2002  Yoldi et al.
2008/0273578 A1   11/2008  Brenner et al.

*Primary Examiner* — Dao Phan
(74) *Attorney, Agent, or Firm* — Ash Tankha; Lipton, Weinberger & Husick

(57) ABSTRACT

A method and a system for reducing time to first fix (TTFF) in a satellite navigation receiver (SNR) includes constructing an integrated satellite constellation system (ISCS) for transmitting navigation signals over a combination of a first carrier frequency, a second carrier frequency, and a third carrier frequency. The ISCS includes a predetermined number of geosynchronous satellites positioned at first predetermined geographic coordinates in a geosynchronous orbit and a predetermined number of geostationary satellites positioned at second predetermined geographic coordinates in a geostationary orbit. The ISCS transmits navigation data to the SNR over the combination of the first carrier frequency, the second carrier frequency, and the third carrier frequency in reduced time, thereby reducing the TTFF in the SNR. The method and the system also reduce TTFF in a hot start mode and a snap start mode of the SNR by utilizing the third carrier frequency as a data channel.

21 Claims, 18 Drawing Sheets

| PARAMETER | DESCRIPTION | NUMBER OF BITS |
|---|---|---|
| Z-COUNT | TIME OF WEEK / SUB-FRAME DURATION | 17 |
| SW | SUB-FRAME SEED WORD (THIS READS FROM 0 TO 5) THE VALUES IN BETWEEN OF Z-COUNT COMMENSURATE WITH THE L5/S1 CHANNEL | 3 |
| SVID | SATELLITE PRN-ID OF THE TRANSMITTING SATELLITE | 5 |
| MSGID | MESSAGE ID | 6 |
| SVID_GPS | SVID OF THE GPS | 5 |
| DATA | DATA | 178 |
| CRC | CYCLIC REDUNDANCY CODE | 24 |
| TAIL | TAIL BITS: 000000 | 6 |
| TOTAL | | 244 |

FIG. 5

TIME TO FIRST FIX OPTIMIZATION IN A SATELLITE NAVIGATION RECEIVER

CROSS REFERENCE TO RELATED APPLICATIONS

This application claims priority to and the benefit of non-provisional patent application number 4162/CHE/2013 titled "Time To First Fix Optimization In A Satellite Navigation Receiver", filed in the Indian Patent Office on Sep. 17, 2013.

The application also claims the benefit of the following patent applications:
1. Non-provisional patent application number 4231/CHE/2011 titled "Navigation Data Structure Generation And Data Transmission For Optimal Time To First Fix", filed in the Indian Patent Office on Dec. 5, 2011.
2. Non-provisional patent application number 4230/CHE/2011 titled "Satellite Navigation System For Optimal Time To First Fix Using Code And Carrier Diversity", filed in the Indian Patent Office on Dec. 5, 2011.
3. Non-provisional patent application number 2011/CHE/2013 titled "Navigation Data Configuration For Optimal Time To First Fix", filed in the Indian Patent Office on May 6, 2013.

The specifications of the above referenced patent applications are incorporated herein by reference in their entirety.

BACKGROUND

Autonomous regional satellite based navigation systems have enabled some countries to cover their territorial footprint and the footprint of their surrounding areas. A regional satellite based navigation system such as a global navigation satellite system (GNSS) caters to the needs of specific users, for example, military personnel for military applications using a precision service (PS) or a restricted service (RS), and civilian users for civilian applications using a standard positioning service (SPS). The global positioning system (GPS) was declared operational in 1995 and is a dual use system. Prior to May 2000, GPS satellites were transmitting dithered GNSS signals—selective availability (SA), denying civilian users from achieving optimal accuracy. Selective availability was an intentional degradation of public GPS signals implemented for national security reasons. To counter this selective availability issue, a user community developed techniques such as differential GPS (DGPS) to improve accuracy. The DGPS was restricted to a limited area. The success of DGPS drove administrators to rethink selective availability, which was turned off in May 2000. Post removal of selective availability (SA), a major error contributor to a measurement of user position was the ionosphere.

As part of navigation data, a health parameter of each of the satellites is also transmitted. This health parameter is updated once every two hours for the GPS L1 signal. However, if there is any anomaly on board a satellite, the anomaly is only communicated in the next broadcast. With the success of the GPS and the need for correction and/or integrity, a satellite based augmentation system (SBAS) program emerged. Extending the benefits of DGPS, the SBAS became an alternative from a global perspective. The SBAS is a defacto standard used in aviation grade receivers. In addition to accuracy improvement, the SBAS provides integrity information. For aviation applications where the integrity information is of paramount importance, a faster update of the health parameter is required. As a consequence, in addition to other messages, the SBAS provides health information within 6 seconds as part of its navigation data. As part of a receiver user equivalent range error (UERE), the major error component is the ionosphere for single frequency applications. With SBAS corrections, the ionosphere error is minimized. Consumer GPS receivers now support the SBAS, which improves position accuracy.

The GPS aided geo-augmented navigation (GAGAN) system or the GPS and geo-augmented navigation (GAGAN) system is a planned implementation of a regional SBAS by the Indian government. The program currently has one satellite transmitting corrections over India. When fully deployed, the GAGAN system will have three satellites. Currently, one GAGAN satellite is operational. The principle of operation of the GAGAN system is as follows: the GPS satellites visible over the Indian subcontinent are continuously tracked at several stations. These stations are equipped with reference station grade receivers, which provide precise estimates of the pseudorange and carrier phase measurements, typically dual frequency systems. The stations also have antennas located at surveyed locations. With these inputs and traits, measurements are formulated. In addition, these reference station grade receivers also provide estimates on anomalies, if any. The integrity stations are spread across the Indian landmass and all these stations relay data to a master control station. Based on the data collected from various stations, messages are generated. This data is uplinked in C-band to the GAGAN satellite. The GAGAN satellites are configured to transmit signals over the Indian subcontinent in a manner similar to the wide area augmentation system (WAAS). GPS receivers equipped to track the SBAS signals are configured to acquire and track these signals.

In another initiative in space based navigation, India is planning to deploy an autonomous regional satellite based navigation system, namely, the Indian regional navigational satellite system (IRNSS), for surveying, telecommunication, transportation, identifying disaster locations, public safety, etc. The overall constellation of the IRNSS will have seven satellites, three of which will be in geostationary orbits and four of which will be in geosynchronous orbits. Based on open source information, the IRNSS will be a dual use dual frequency system. The signals transmitted by the IRNSS satellites will be in the L5 and S1 band of operation. The civilian signal adopts binary phase shift keying (BPSK) modulation, while a restricted service (RS) will have binary offset carrier (BOC) modulation. The center frequencies will be 1176.45 megahertz (MHz) and 2492.028 MHz. A signal design issue during the initial phases of frequency selection is interoperability with other existing systems, where the signal transmitted by a new system is required to co-exist with existing operational systems. Moreover, from a GNSS serviceability point of view, the signal should typically be in the L band, which is relatively optimal from ionosphere and troposphere related effects. Furthermore, at the time of frequency filing, the signal should be available and should not have been filed by another country. Given the above tradeoffs, the IRNSS signal has evolved with the above recited frequency constraints.

With respect to the control segment, the IRNSS regional integrity monitoring stations (RIMS) will be deployed at several places in the Indian subcontinent. These stations will be equipped with high end receivers which will provide relevant information about the IRNSS satellites. With the signal transmission from the first satellite, these receivers will perform measurements and collect navigation data. The data will be relayed to a master control station. In turn, the master control station will generate Keplerian parameters of all the satellites, clock correction terms, and secondary navigation data information. Unlike the GAGAN system, this is an involved activity that determines the overall system accuracy. The coverage of the IRNSS and the GAGAN system is primarily intended for operation over the Indian subcontinent. In order to improve the accuracy of the IRNSS and to acquire the integrity information, there is a need for an SBAS incorporated IRNSS which reduces payload requirements and avoids the operational overheads required to maintain separate tracking and separate control stations.

A number of issues need to be addressed in the design of a satellite navigation system, for example, sensitivity improvements, jamming margins, robustness towards spoofing, multipath related improvements, time to first fix (TTFF), etc., for ensuring efficiency and robustness of the satellite navigation system. A design parameter that needs to be optimized is the TTFF parameter, which is a measure of time needed by a satellite navigation receiver to acquire satellite signals and navigation data, and calculate a position solution, referred to as a "fix". The TTFF parameter directly influences the efficiency of position tracking by the satellite navigation receiver. The TTFF parameter is an important receiver specification parameter that serves as a yardstick for comparing satellite navigation receivers from different manufacturers. In order to process a navigation signal emanating from a satellite, a global positioning system (GPS) L1 frequency receiver first establishes a lock on code and carrier frequency. Subsequently, in the lock condition, navigation data from the satellite is demodulated. Conventional satellite navigation receivers require a minimum of four satellites to compute the user navigation solution based on navigation measurements, for example, pseudorange measurements, delta range measurements, etc., and satellite state vectors, for example, the position of the satellite, the velocity of the satellite, etc. For an optimal TTFF performance, there is a need for minimizing the time taken for computing navigation measurements and collecting subsequent navigation data.

A study was carried out on a signaling scheme of operational navigation systems with respect to multiple frequencies of operation. Of all the parameters used to compute TTFF, collection time of ephemeris data ($T_{eph}$) is a major contributor as $T_{eph}$ completely depends on a navigation data structure of a particular constellation and does not depend on the receiver. In addition, TTFF varies based on various receiver start modes. In general, the start modes can be classified into four categories, for example, a cold start mode, a warm start mode, a hot start mode, and a snap start mode. In the cold start mode, the receiver is powered on without any prior information. This results in more time for computation of the navigation solution as the receiver has to search the signals of all the satellites of a GNSS constellation to obtain a signal lock, demodulate the data bits, and collect the entire navigation data. In the warm start mode, the receiver has access to almanac data, approximate user position and time, which provides an estimate of all the visible satellites. The receiver pre-positions only the visible satellites onto available channels and attempts to acquire the signals. To this extent, the warm start mode differs from the cold start mode, wherein the initial search time to lock on the satellites is reduced. Typically, the TTFF for the cold start mode and the warm start mode is, for example, about 100 seconds and about 48 seconds respectively. The above described start modes are meant for open sky applications.

The next two categories of receiver start modes are the hot start mode and the snap start mode. These start modes are used in automotive grade receivers, wherein the receivers have access to additional parameters. The hot start mode and the snap start mode are used for indoor and high sensitivity applications and are receiver dependent. Specifically, in the hot start mode, the receiver has access to the latest navigation data, that is, ephemeris data, either stored in a memory from the last power-on, or from an external real time aid. As such, the receiver only needs to obtain the time accurately from the satellite. In case of the GPS, a hand over word (HOW) has Z-count information or a time parameter, which repeats once every 6 seconds. Thus, with sub-frame synchronization, the receiver will be able to collect time and in turn make measurements.

The snap start mode is the best case for TTFF, wherein all the receiver parameters including clock parameters of the receiver are available at power on. This category of the receiver makes an assumption that the receiver was recently powered on and that the clock estimate propagated internally is valid for signal processing purposes. With this, the receiver achieves instantaneous lock and with word synchronization, the receiver computes user position. The TTFF for the hot start mode is, for example, about 8 seconds to about 14 seconds, and the TTFF for the snap start mode is 2 seconds. The GPS and the GNSS have civilian ranging codes on dual or triple frequencies. In addition, current receivers have no limitation on the number of channels and thus dual frequency processing has become a defacto standard. With the proposal to deploy the IRNSS over the Indian subcontinent, there is a need for improving the TTFF of the GNSS in the hot start mode and the snap start mode of receiver operation using a data channel on board the geosynchronous satellites of the IRNSS.

Hence, there is a long felt but unresolved need for an SBAS incorporated satellite navigation system that provides a dedicated data channel for improving the TTFF using a third frequency. Moreover, there is a need for a method and system for reducing the TTFF in a satellite navigation receiver operating in the hot start mode and the snap start mode.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above stated needs for a satellite based augmentation system (SBAS) incorporated satellite navigation system that provides a dedicated data channel for improving time to first fix (TTFF) using a third frequency, herein referred to as a "third carrier frequency". The method and the system disclosed herein also reduce the TTFF in a satellite navigation receiver operating in a hot start mode and a snap start mode. The method and the system disclosed herein derive the third frequency of operation in the Indian regional navigational satellite system (IRNSS) and establish an engineering synergy between the IRNSS and the global positioning system (GPS) aided geo-augmented navigation system (GAGAN), which is the SBAS over the Indian subcontinent.

In the method and system for reducing time to first fix in the satellite navigation receiver, an integrated satellite constellation system configured to transmit navigation signals comprising navigation data over a combination of a first carrier frequency, a second carrier frequency, and a third carrier frequency is constructed. As used herein, the first carrier frequency is the L5 frequency (1176.45 megahertz (MHz)), the second carrier frequency is the S1 frequency (2492.08 MHz), and the third carrier frequency is the L1 frequency (1575.42 MHz). The integrated satellite constellation system is constructed by positioning a predetermined number of geosynchronous satellites operating in the first carrier frequency and the second carrier frequency at first predetermined geographic coordinates in a geosynchronous orbit, and by positioning a predetermined number of geostationary satellites operating in the third carrier frequency at second predetermined geographic coordinates in a geostationary orbit among the predetermined number of geosynchronous satellites. The constructed integrated satellite constellation system parallelly transmits sub-frames of navigation data to the satellite navigation receiver over a combination of the first carrier frequency, the second carrier frequency, and the third carrier frequency in reduced time, thereby reducing the time to first fix in the satellite navigation receiver.

In a real time, hot start mode of the satellite navigation receiver, the satellite navigation receiver parallelly receives multiple navigation signals from multiple satellites of the integrated satellite constellation system via multiple input channels. Each navigation signal comprises sub-frames configured to selectively accommodate navigation data. The satellite navigation receiver is configured to receive each sub-frame of navigation data via one of the input channels. The satellite navigation receiver extracts ephemeris data, ionospheric data, coordinated universal time (UTC) data, and textual data from the sub-frames of navigation data of each of the navigation signals. In an embodiment, almanac data is transmitted as part of the textual data. The satellite navigation receiver extracts the ephemeris data from the navigation signals transmitted over the third carrier frequency. The satellite navigation receiver extracts the ionospheric data, the UTC data, and the textual data from the navigation signals transmitted over the first carrier frequency and the second carrier frequency. The parallel acquisition of the ephemeris data, the ionospheric data, the UTC data, and the textual data over the first carrier frequency, the second carrier frequency, and the third carrier frequency, reduces the time to first fix in the satellite navigation receiver.

The system for reducing the time to first fix in the satellite navigation receiver disclosed herein comprises multiple ground monitoring stations and a ground master control station. The ground monitoring stations receive primary navigation signals transmitted by multiple satellites of a constellation over the first carrier frequency and the second carrier frequency. The ground monitoring stations extract primary navigation data comprising the ephemeris data from the received primary navigation signals. The ground monitoring stations further relay the extracted primary navigation data to the ground master control station. The ground master control station collates the relayed primary navigation data from the ground monitoring stations to create a list of satellites visible over a predetermined geographical location, for example, over the Indian subcontinent. The ground master control station determines selective ephemeris data comprising healthy ephemeris data from the relayed primary navigation data transmitted by the visible satellites. As used herein, the term "healthy ephemeris data" refers to ephemeris data of GPS satellites whose health field reads all zeros, indicating that the GPS satellites are healthy. The ground master control station further generates a navigation data structure configured to accommodate the selective ephemeris data. The ground master control station transmits the selective ephemeris data in the generated navigation data structure to the geosynchronous satellites of the integrated satellite constellation system over the third carrier frequency. The satellite navigation receiver parallelly receives the selective ephemeris data from the geosynchronous satellites of the integrated satellite constellation system in reduced time, thereby reducing the time to first fix in the satellite navigation receiver.

In an embodiment of the hot start mode of the satellite navigation receiver, the satellite navigation receiver receives navigation signals transmitted by multiple satellites of a constellation over the first carrier frequency, the second carrier frequency, and the third carrier frequency via multiple input channels. Each of the navigation signals is configured to transmit navigation data comprising ephemeris data and time of week (TOW) data. The satellite navigation receiver extracts ephemeris data from the received navigation signals over the third carrier frequency by locking the input channels operating at the first carrier frequency and the second carrier frequency. The satellite navigation receiver further acquires the TOW data from the satellites over the first carrier frequency and the second carrier frequency. The extraction of the ephemeris data over the third carrier frequency and the acquisition of the TOW data over the first carrier frequency and the second carrier frequency reduce the time to first fix in the satellite navigation receiver.

In an embodiment, the ground monitoring stations of the system disclosed herein receive multiple navigation signals transmitted by multiple satellites of a constellation over the first carrier frequency and the second carrier frequency. The ground monitoring stations extract the navigation data from the received navigation signals and relay the extracted navigation data to the ground master control station. The ground master control station collates the relayed navigation data from the ground monitoring stations to create a list of satellites visible over a predetermined geographical location. The ground master control station generates a navigation data structure comprising a first sub-frame, a second sub-frame, and a third sub-frame configured to selectively accommodate healthy ephemeris data and clock parameters extracted from the collated navigation data. The ground master control station parallelly transmits the ephemeris data and the clock parameters in the first sub-frame, the second sub-frame, and the third sub-frame of the generated navigation data structure to the geosynchronous satellites of the integrated satellite constellation system over the third carrier frequency. The satellite navigation receiver parallelly receives the ephemeris data and the clock parameters from the geosynchronous satellites of the integrated satellite constellation system in reduced time, thereby reducing the time to first fix in the satellite navigation receiver.

In an optimal restricted mode (ORM) of operation of the satellite navigation receiver, the satellite navigation receiver receives navigation signals transmitted over a dedicated carrier frequency by the geostationary satellites of the integrated satellite constellation system. In this embodiment, the satellite navigation receiver is operating in a restricted mode. The navigation signals transmitted over the dedicated carrier frequency are configured for a predetermined frequency of, for example, 1 KHz and a predetermined signal strength of, for example, −157 decibel-watt (dBW). The satellite navigation receiver further receives navigation signals transmitted over the first carrier frequency and the second carrier frequency by the geosynchronous satellites of the integrated satellite constellation. The satellite navigation receiver acquires ephemeris data from the navigation signals transmitted over the dedicated carrier frequency, and almanac data, coordinated universal time (UTC) data, ionospheric data, and clock parameters from the navigation signals transmitted over the first carrier frequency and the second carrier frequency in reduced time, thereby reducing the time to first fix in the satellite navigation receiver.

In an embodiment, the satellite navigation receiver acquires time of week (TOW) data from first navigation signals transmitted over the third carrier frequency. In this embodiment, the satellite navigation receiver acquires a restricted signal transmitted over the dedicated carrier frequency based on the acquired TOW data. The satellite navigation receiver then acquires the ephemeris data from second navigation signals transmitted over the dedicated carrier frequency, and almanac data, ionospheric data, and clock parameters from third navigation signals transmitted over the first carrier frequency and the second carrier frequency in reduced time, thereby reducing the time to first fix in the satellite navigation receiver. With the availability of the first carrier frequency and the second carrier frequency, the third carrier frequency is acquired. Further, the enhanced data rate on the third carrier frequency enables the user to obtain the navigation data of the restricted service faster.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 5 exemplarily illustrates a tabular representation of a navigation data structure for transmitting navigation data on a third carrier frequency for the hot start mode of the satellite navigation receiver.

DETAILED DESCRIPTION OF THE INVENTION

Figure 1:
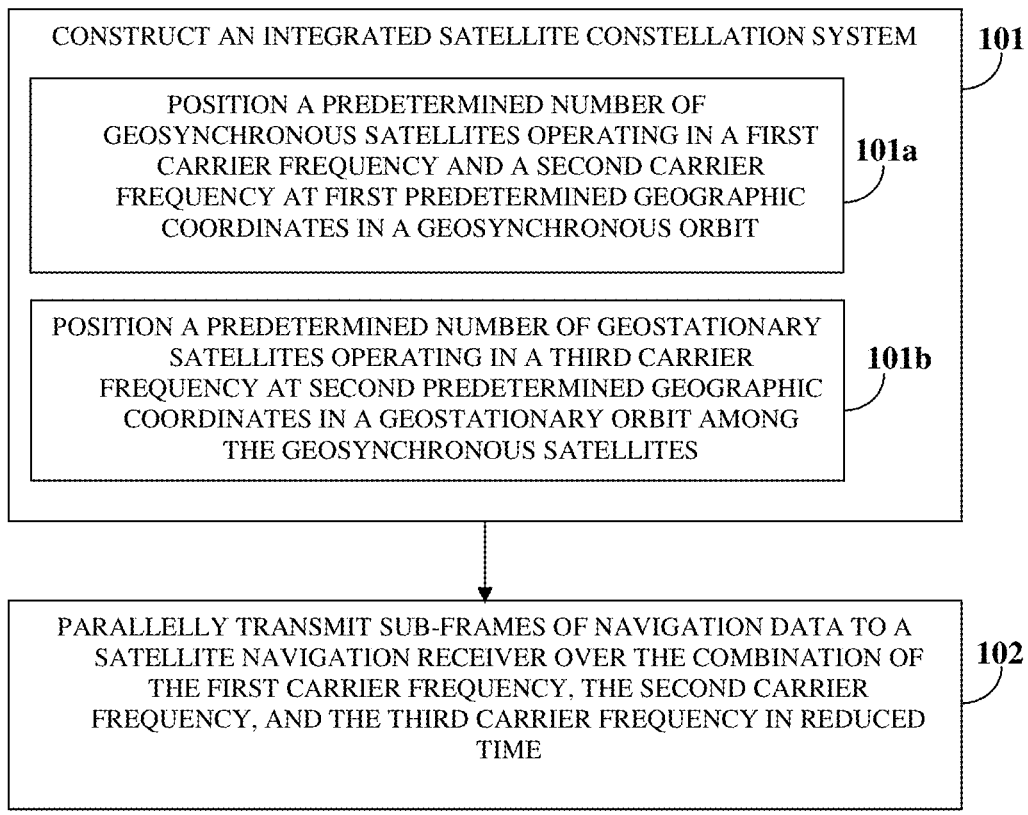
FIG. 1 illustrates a method for reducing time to first fix in a satellite navigation receiver by constructing an integrated satellite constellation system.

FIG. 1 illustrates a method for reducing time to first fix in a satellite navigation receiver by constructing an integrated satellite constellation system. As used herein, the term "integrated satellite constellation system" refers to a combined satellite constellation architecture comprising the Indian regional navigational satellite system (IRNSS) and the global positioning system (GPS) aided geo-augmented navigation (GAGAN) system. The integrated satellite constellation system is also referred to as the "IRNSS+GAGAN system". The IRNSS satellites are yet to be launched and are distributed as four geosynchronous satellites and three geostationary satellites. The four geosynchronous satellites are distributed in two planes, with two geosynchronous satellites in each plane. The IRNSS is configured to beam satellite signals in the L5 frequency band and the 51 frequency band. Two out of the three GAGAN satellites are already launched and deployed. The GAGAN satellites, namely, GSAT-8 and GSAT-10, comprising the GAGAN system payload, are in the final and initial stages of user testing, respectively. The integrated satellite constellation system disclosed herein derives a third frequency of operation in the IRNSS and establishes an engineering synergy between the IRNSS and the GAGAN system. The GAGAN system is the satellite based augmentation system (SBAS) over the Indian subcontinent.

For optimization purposes, the satellite signals of the IRNSS+GAGAN system over the Indian subcontinent are based on a few assumptions. For example, it is assumed that there are no backward compatibility issues between the IRNSS and the GAGAN system from a user perspective. The IRNSS and the SBAS address different objectives with the SBAS not being configured for ranging. Thus, compatibility issues do not apply in the IRNSS+GAGAN system as compared to existing satellite systems, for example, GPS L5 with L2C and L1 coarse and/or acquisition (C/A) code signals being present. Another assumption is based on interoperability between IRNSS and GAGAN-intra and across global navigation satellite system (GNSS)-inter systems. Since the IRNSS and the GAGAN system have been conceived and are in the development stage, it is assumed that signal levels do not pose a mutual problem as the diversity that exists between the GAGAN system with the L1 frequency band and the IRNSS with L5 and S1 frequency bands includes operating in different frequency bands. Further, the integrated satellite constellation system is comparable to a wide area augmentation system (WAAS) and the GPS L5 over the North American continent. Moreover, since the GAGAN system and the IRNSS are in the developmental stage, it is assumed that all the necessary studies with respect to the satellite signals of the GAGAN system and the IRNSS co-existing with other GNSSs in the coverage region, for example, the Indian subcontinent, for mutual co-existence have been carried out.

Another assumption is based on frequency filing. The first GAGAN satellite transmits a satellite signal or a navigation signal and uses codes and/or frequencies as supported by the SBAS. Moreover, the SBAS is a coordinated effort across GNSS bodies. Both these points assume and/or obviate the frequency filing proposition. For the IRNSS, which is in the development stage, it is assumed that the codes and/or frequencies have been filed and approved by international governing bodies. With the IRNSS signals onboard the GAGAN satellites, the GAGAN satellites can radiate three signals in the L5 frequency band, the L1 frequency band, and the S1 frequency band. Further, the L1 frequency band is generalized to the IRNSS geosynchronous satellites as the third frequency, herein referred to as the "third carrier frequency", which is used for improving the time to first fix (TTFF) parameter of the GNSS in line of sight (LOS) applications.

In the method for reducing the time to first fix in the satellite navigation receiver, the integrated satellite constellation system configured to transmit navigation signals comprising navigation data over a combination of a first carrier frequency, a second carrier frequency, and a third carrier frequency is constructed 101. As used herein, the first frequency is the L5 frequency (1176.45 megahertz (MHz)), the second carrier frequency is the S1 frequency (2492.08 MHz), and the third carrier frequency is the L1 frequency (1575.42 MHz). The integrated satellite constellation system disclosed herein combines both the IRNSS and the GAGAN system and explores the emergence of a third frequency of operation. The integrated satellite constellation system is analyzed based on availability and accuracy to assess the performance of the integrated satellite constellation system in comparison with the standalone architectures of the IRNSS and the GAGAN system. An analysis is performed within the integrated satellite constellation system for optimization with respect to the satellites to present the availability and/or accuracies achievable.

The integrated satellite constellation system is constructed by positioning 101a a predetermined number of geosynchronous satellites operating in the first carrier frequency and the second carrier frequency at first predetermined geographic coordinates in a geosynchronous orbit, and by positioning 101b a predetermined number of geostationary satellites operating in the third carrier frequency at second predetermined geographic coordinates in a geostationary orbit among the predetermined number of the geosynchronous satellites. The geostationary satellites are present as part of both the IRNSS and the GAGAN system. The positions of the geosynchronous satellites and the geostationary satellites are as follows:

| Constellation | Description | |
|---|---|---|
| | Geostationary Satellites | Geosynchronous Satellites |
| Existing IRNSS | 34°, 83°, and 132° east | 55°, 111° east |
| GAGAN system | 55°, 83°, and 111° east | — |
| Integrated satellite constellation system | 55°, 83°, and 111° east | 55°, 111° east |

The position 111° east longitude for the third GAGAN satellite is considered to create a common overlapped foot print with the existing satellites of the GAGAN system and thus to facilitate redundancy from a system perspective, for example, in the event of a satellite failure. Furthermore, the multi-functional satellite augmentation system (MSAS) is relatively close to this assumed position and thus a system level redundancy of the integrated satellite constellation system is also met.

The constructed integrated satellite constellation system parallelly transmits 102 sub-frames of navigation data to the satellite navigation receiver over the combination of the first carrier frequency, the second carrier frequency, and the third carrier frequency in reduced time, thereby reducing the time to first fix in the satellite navigation receiver.

Figure 2A:
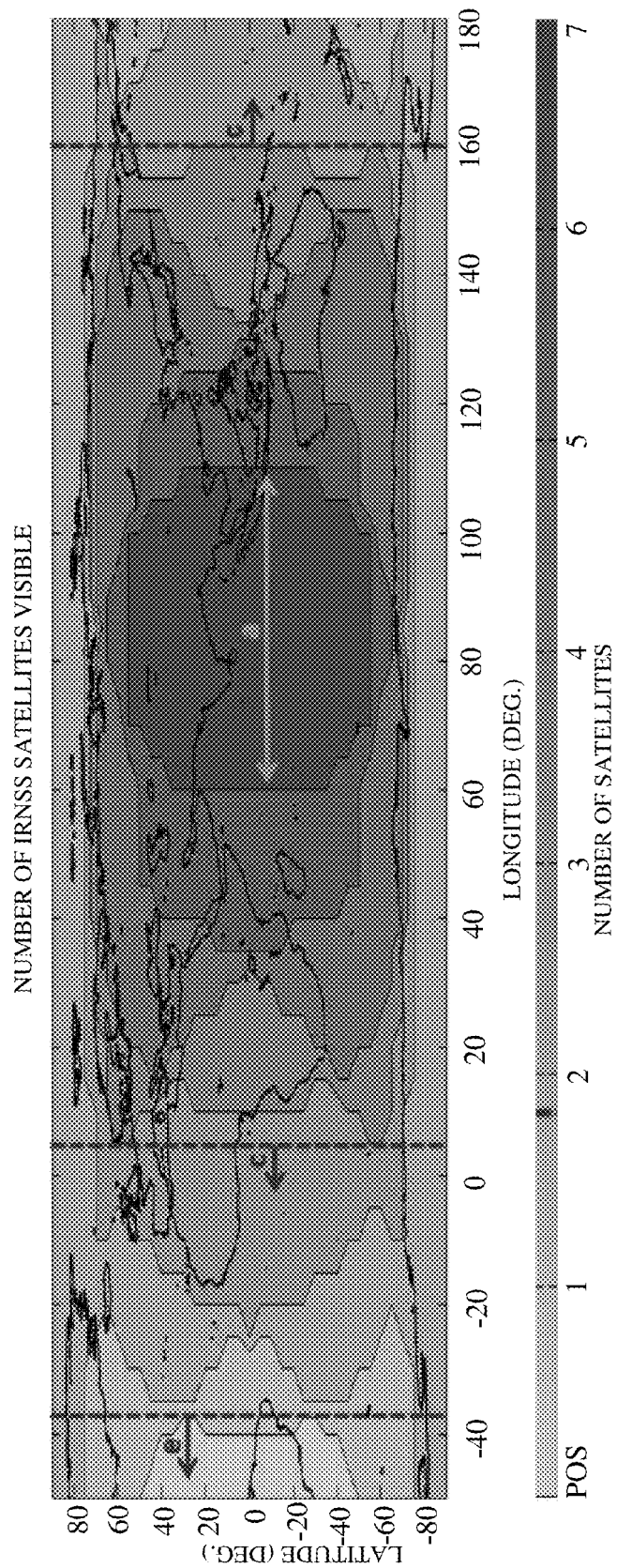
FIGS. 2A-2B exemplarily illustrate graphical representations showing satellite availability with the existing Indian regional navigational satellite system and the integrated satellite constellation system.
Figure 2B:
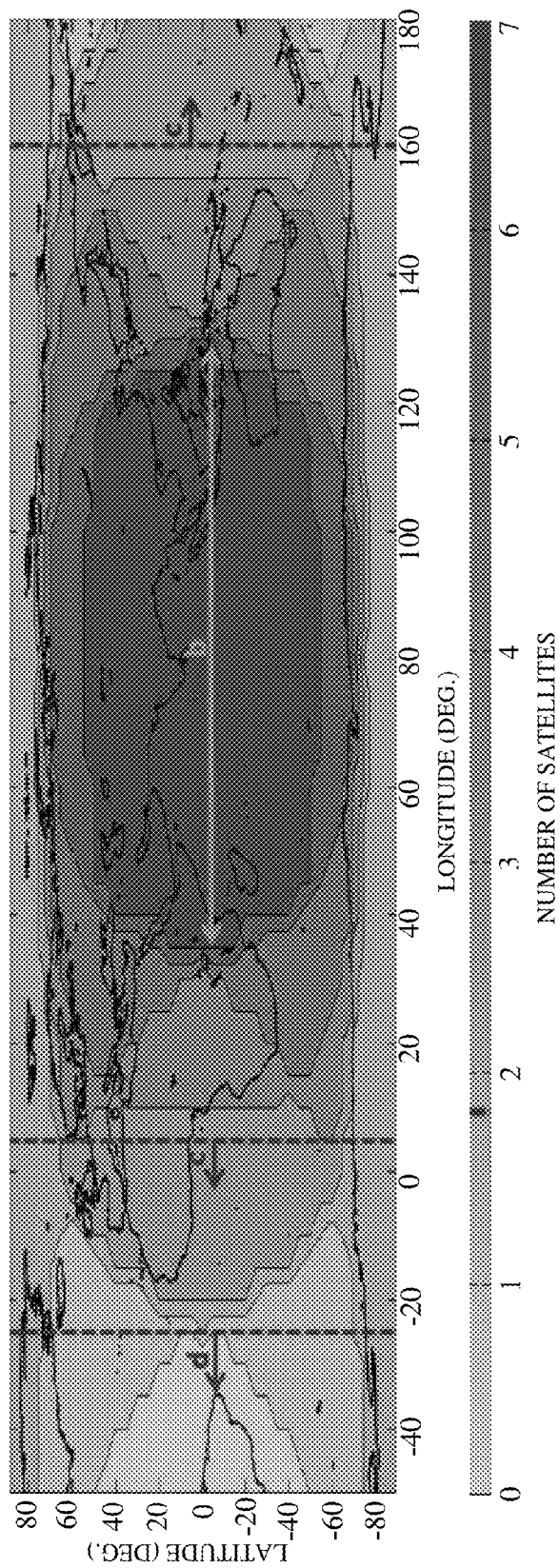

FIGS. 2A-2B exemplarily illustrate graphical representations showing satellite availability with the existing Indian regional navigational satellite system (IRNSS) and the integrated satellite constellation system. The satellite availability with the constructed integrated satellite constellation system is exemplarily illustrated in FIG. 2B. As exemplarily illustrated in FIGS. 2A-2B, there is an improvement of the standalone visibility of the constructed integrated satellite constellation system as compared to the IRNSS standalone visibility. The integrated satellite constellation system shows an improved or a wider common footprint, exemplarily illustrated in FIG. 2B, as opposed to the satellite availability of the existing IRNSS, exemplarily illustrated in FIG. 2A, thereby resulting in a positional dilution of precision (PDOP) improvement as exemplarily illustrated in FIGS. 3A-3B. FIG. 2A exemplarily illustrates a polygonal area "a", where all seven satellites of the IRNSS are visible. Outside this polygonal area, the visibility of satellites positioned at 34° east longitude and 132° east longitude is lost, on both sides, and thus the satellite availability drops to six satellites. In contrast, with the constructed integrated satellite constellation system, the area "b" exemplarily illustrated in FIG. 2B, is wider due to the close spacing of the geostationary satellites at 55° east longitude and 111° east longitude, which results in a wider coverage area along with the geosynchronous satellites, thereby providing an improvement in the availability area from a regional perspective.

The existing IRNSS facilitates independent positioning and hence the integrated satellite constellation system is configured to maximize the coverage area where independent positioning can be established. As exemplarily illustrated in FIG. 2B, the satellite availability to the west of line "c" remains the same and is less than 4 satellites. Thus, the effective region of independent operation is east of the "c" line for either configuration, that is, for the IRNSS and the integrated satellite constellation system, because in either configuration visibility to the geostationary satellite positioned at 83° east longitude is lost. A similar phenomenon exists on the right side of the "a" polygon exemplarily illustrated in FIG. 2A, and the "b" polygon exemplarily illustrated in FIG. 2B.

Figure 3A:
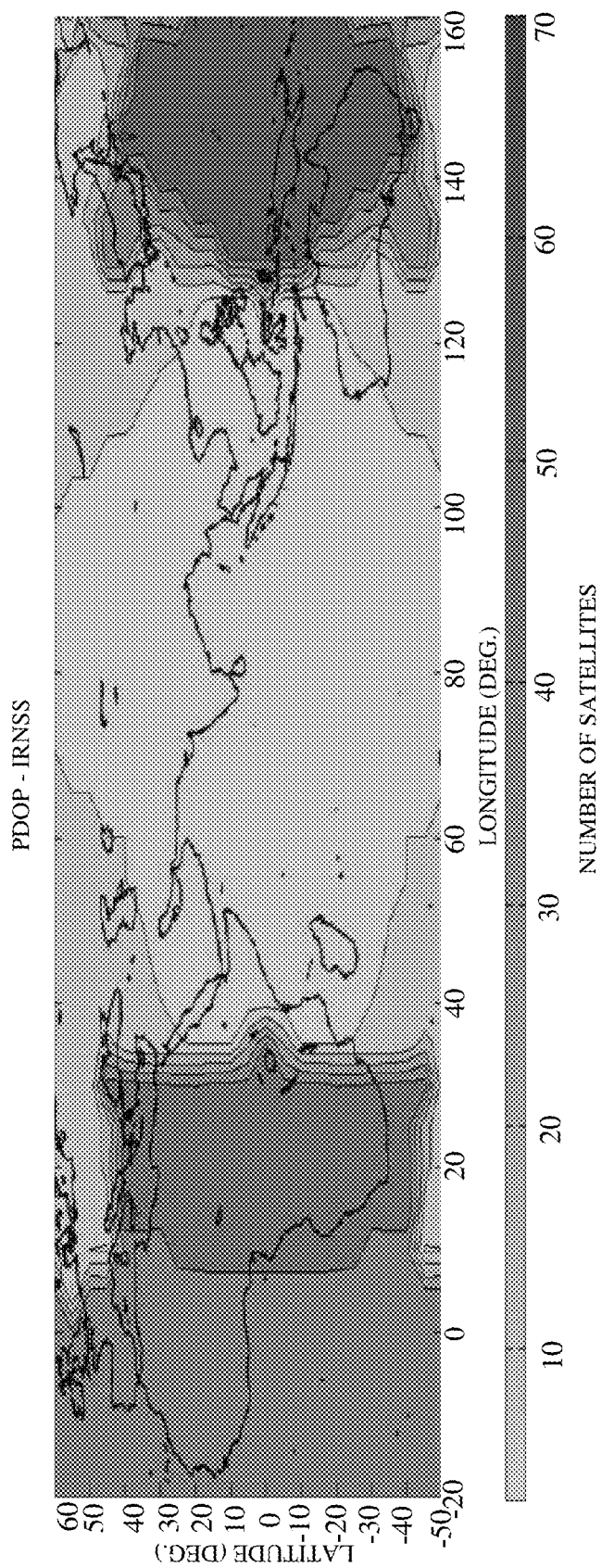
FIGS. 3A-3B exemplarily illustrate graphical representations showing positional dilution of precision with the existing Indian regional navigational satellite system and the integrated satellite constellation system.
Figure 3B:
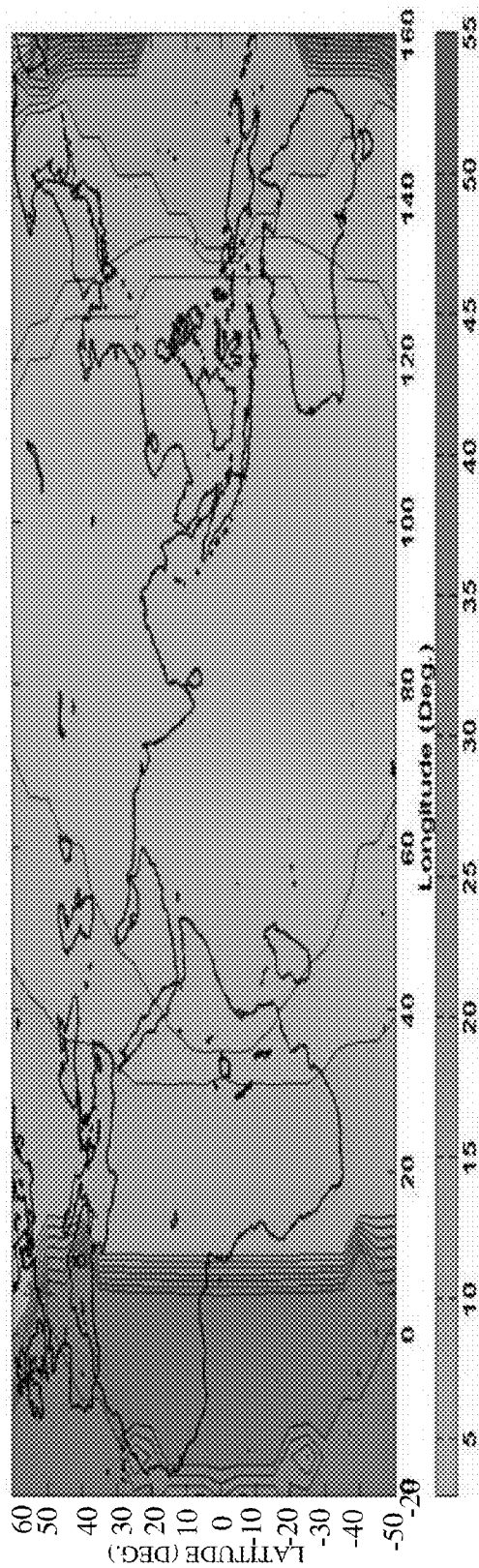

FIGS. 3A-3B exemplarily illustrate graphical representations showing positional dilution of precision with the existing Indian regional navigational satellite system (IRNSS) and the integrated satellite constellation system. As exemplarily illustrated in FIGS. 3A-3B, there is an improvement in the positional dilution of precision (PDOP) performance of the constructed integrated satellite constellation system as compared to the PDOP of the standalone IRNSS. One of the reasons for positioning the existing IRNSS geostationary satellites at 34° east longitude and 132° east longitude is for extended coverage of the IRNSS as exemplarily illustrated in FIGS. 3A-3B. To the west of the line "d" and the line "e" exemplarily illustrated in FIGS. 2A-2B, the visibility is completely lost in both the integrated satellite constellation system and the existing IRNSS. This is attributed to the visibility of the geostationary satellites positioned at 55° east longitude and 34° east longitude, respectively. Though visibility is established for an extended range of about 15° with the existing IRNSS constellation, the visibility does not assist with independent positioning. A similar condition exists on the right side of the "a" polygon and the "b" polygon exemplarily illustrated in FIGS. 2A-2B. The integrated satellite constellation system disclosed herein does not have any impact on the global positioning system (GPS) aided geo-augmented navigation (GAGAN) system with respect to availability as the positions of the geostationary satellites are the same in the integrated satellite constellation system and the GAGAN system.

With few additional messages exclusively for the IRNSS, the GAGAN system can be modified to account for satellite based augmentation system (SBAS) corrections of the IRNSS. Through textual data as disclosed in the co-pending non-provisional patent application number 2011/CHE/2013 titled "Navigation Data Configuration For Optimal Time To First Fix", some of these SBAS messages for the IRNSS can be supported. Furthermore, due to the inherent data rate limitations, for example, about 50 Hz and the need for some of the messages to be fast, for example, fast correction messages of the SBAS, a dedicated medium is required. The dedicated medium is defined by additional messages onboard the GAGAN system transmitted by a process similar to the transmission of SBAS messages of the global navigation satellite system (GLONASS) in the European geostationary navigation overlay service (EGNOS) in addition to the GPS. Critical applications demand the global navigation satellite system (GNSS) receiver to support a high signal dynamic, which necessitates wide Doppler search ranges. This coupled with high data rates of about 500 samples per second (sps) introduces a sensitivity constraint with respect to SBAS acquisition in a standalone mode. For example, no estimates of position, velocity, almanac or time are available for acquisition. With the integrated satellite constellation system, the IRNSS satellites when tracked in the L5/S1 frequency bands can directly assist the L1 frequency band of the SBAS and thus improve performance with respect to acquisition in high dynamics.

The integrated satellite constellation system comprising the GAGAN satellites with IRNSS frequencies eliminate three IRNSS geostationary satellites. Unlike the satellites of the GAGAN system, the IRNSS satellites are dedicated navigational satellites. Assuming an estimate, for example, of about 100 million dollars (USD) per satellite including launch, a significant reduction in the overall cost is achieved, for example, of about 300 million USD with the integrated satellite constellation system disclosed herein. At the same time, the specifications of the GAGAN system and the IRNSS are met. A synergized network can be established to have a common control and monitoring station for both the IRNSS and the GAGAN system ensuring that all system parameters are obtained as required by the individual systems and collated at a common master control station, thereby reducing the operational overheads. With the geosynchronous satellites always visible over the Indian subcontinent, the third carrier frequency, that is, the L1 frequency can be used for safety of life applications. Since these satellites carry the L5/S1 signals and assuming collaborative tracking, that is, assistance from the existing acquired and/or tracking channel, the data rate can be increased to 1 KHz on these channels without increasing power.

Figure 4:
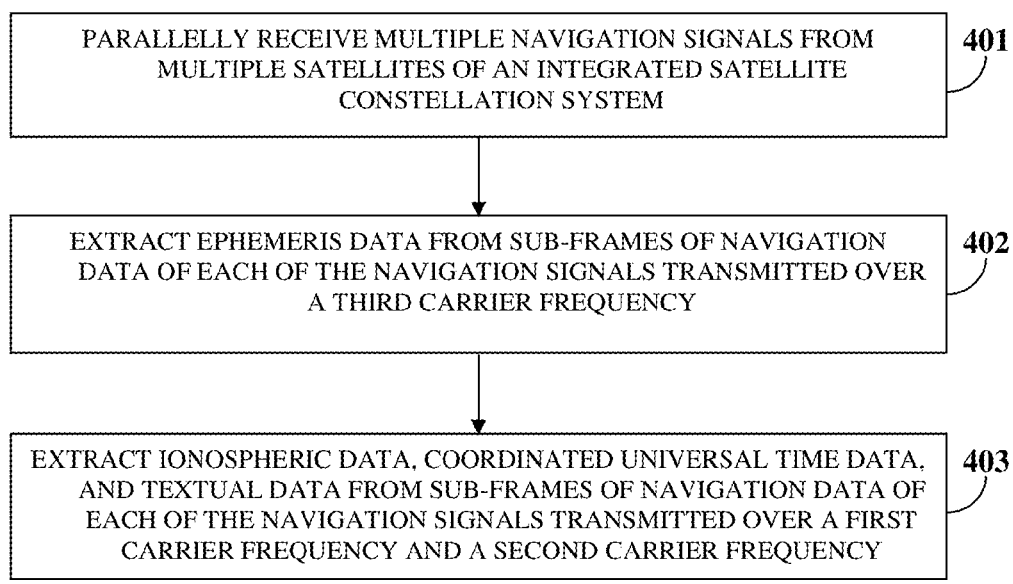
FIG. 4 illustrates a method for reducing time to first fix during a hot start mode of the satellite navigation receiver.

FIG. 4 illustrates a method for reducing time to first fix (TTFF) during a hot start mode of the satellite navigation receiver. The third carrier frequency derived as a result of the integrated satellite constellation system constructed as disclosed in the detailed description of FIG. 1, can be used as a data channel. The four geosynchronous satellites of the integrated satellite constellation system can be used for any user specific application, which is herein adapted to enhance the TTFF. Using the geosynchronous satellites over the Indian subcontinent along with the Indian regional navigational satellite system (IRNSS) in a dual frequency mode of operation, a real time, hot start of the global navigation satellite system (GNSS), for example, the global positioning system (GPS), the global navigation satellite system (GLONASS), etc., can be achieved. The hot start mode of satellite navigation receiver operation assumes that the primary navigation data comprising ephemeris data, time, approximate user position, etc., is available through external aiding, for example, an assisted GPS (AGPS) in an ephemeris assistance mode. In the method disclosed herein, the satellite navigation receiver parallelly receives 401 multiple navigation signals from multiple satellites of the integrated satellite constellation system via multiple input channels. Each of the navigation signals comprises sub-frames configured to selectively accommodate navigation data. The satellite navigation receiver is configured to receive each of the sub-frames of navigation data via one of the input channels. With an optimal civilian mode (OCM) of operation disclosed in the co-pending non-provisional patent application number 2011/CHE/2013 titled "Navigation Data Configuration For Optimal Time To First Fix", the third carrier frequency is instantaneously acquired. The third carrier frequency acquisition refers to a restricted signal, whose acquisition demands the availability of time. With the OCM method, the time availability can be enhanced, which acts as an aid to acquire the third carrier frequency or the restricted signal. With the availability of the first carrier frequency and the second carrier frequency, the third carrier frequency is acquired. The enhanced data rate on the third carrier frequency enables a user to obtain the navigation data of the restricted service faster.

In the method disclosed herein, the satellite navigation receiver extracts 402 ephemeris data from the sub-frames of navigation data of each of the navigation signals transmitted over the third carrier frequency. With the ephemeris data of the other GNSSs, for example, the GPS, the GLONASS, Galileo, etc., transmitted on the third carrier frequency, a user will have access to the ephemeris data within 6 seconds. The satellite navigation receiver extracts 403 ionospheric data, coordinated universal time (UTC) data, and textual data from the sub-frames of navigation data of each of the navigation signals transmitted over the first carrier frequency and the second carrier frequency. With position, time from the IRNSS, and the ephemeris data of the GNSS, the satellite navigation receiver immediately estimates the position from the other GNSS. With the OCM method, user position is available within 6 seconds. The parallel acquisition of the ephemeris data, the ionospheric data, the coordinated universal time data, and the textual data over the first carrier frequency, the second carrier frequency, and the third carrier frequency reduces the TTFF in the satellite navigation receiver. The TTFF obtained via the OCM method in a cold start mode equals the TTFF of other GNSSs operating in a hot start mode.

FIG. 5 exemplarily illustrates a tabular representation of a navigation data structure for transmitting navigation data on a third carrier frequency for the hot start mode of the satellite navigation receiver. The navigation data transmission as part of the third carrier frequency in the Indian regional navigational satellite system (IRNSS) is disclosed herein. The satellite based augmentation system (SBAS) or the global positioning system (GPS) aided geo-augmented navigation system (GAGAN) navigation data structure has been adopted to transmit the primary navigation data of the global positioning system (GPS) and/or the global navigation satellite system (GLONASS) satellites. In this method, the navigation data of only those satellites that are healthy are transmitted from the third carrier frequency. The ephemeris health bits of healthy satellites are all zeros in the GPS. The definitions and the number of bits are configured as in the GPS interface control documents (ICD) 2010. For example, the primary navigation data parameters are structured in the navigation data structure as disclosed in the co-pending non-provisional patent application number 4231/CHE/2011 titled "Navigation Data Structure Generation And Data Transmission For Optimal Time To First Fix". The resultant message structure is exemplarily illustrated in FIG. 5.

As exemplarily illustrated in FIG. 5, the navigation data structure comprises 244 bits in each sub-frame encoded to obtain 488 symbols. The symbols are appended with a 12 bit sync pattern to obtain 500 symbols in accordance with the SBAS navigation data structure. The navigation data structure exemplarily illustrated in FIG. 5 is equally valid for the global navigation satellite system (GLONASS) with the data set filled from the first four strings of the GLONASS as per GLONASS ICD 1998. Further, the first sub-frame of the navigation data structure contains string 1 and string 2 data information, and the second sub-frame contains the data information of string 3, string 4, and string 5. In the GLONASS, the third sub-frame is not present. A satellite vehicle identity (SVID) corresponds to a frequency identifier (ID) of the satellite which is visible and mapped from −7 to 6.

Figure 6:
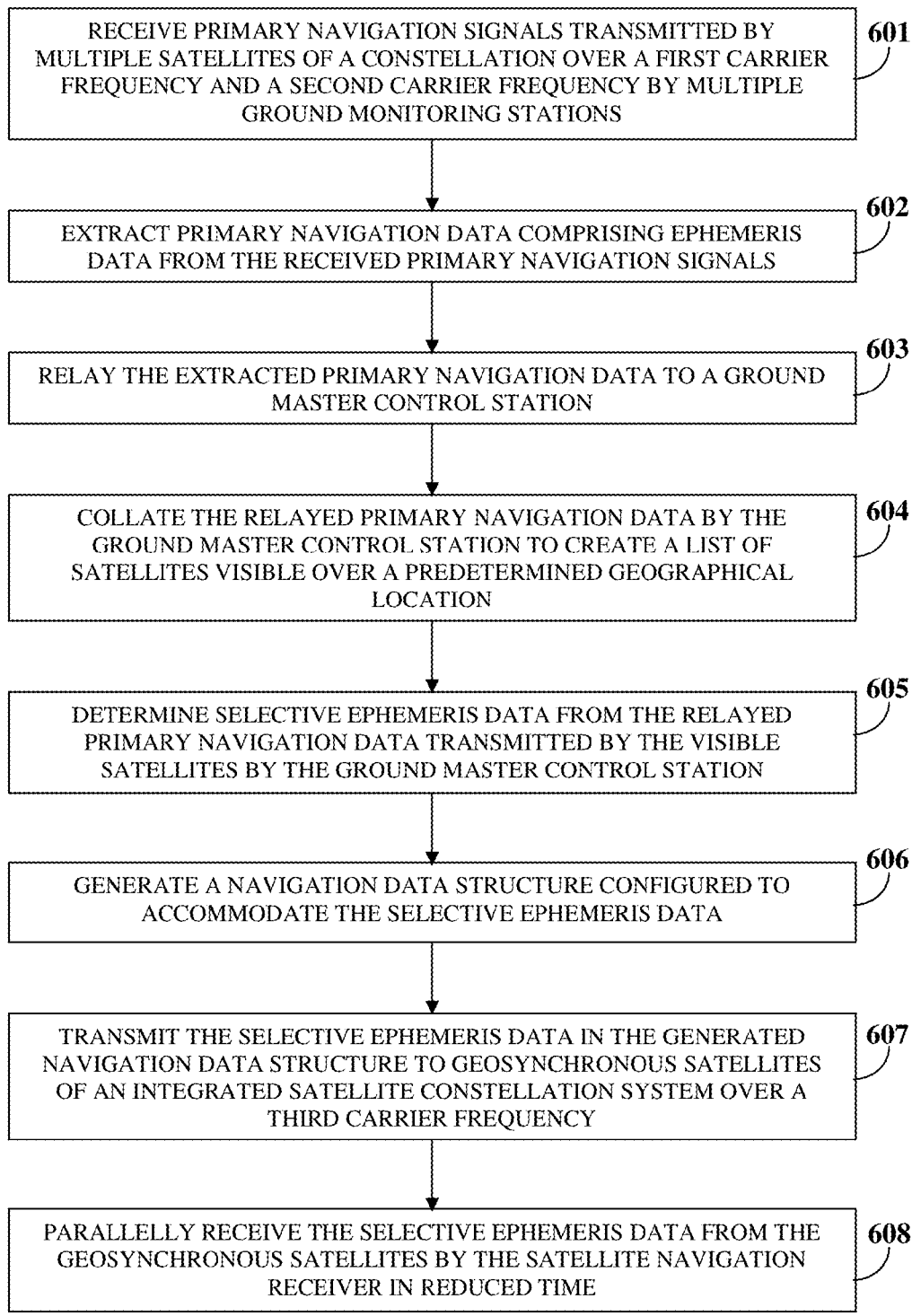
FIG. 6 illustrates an embodiment of the method for reducing time to first fix in the satellite navigation receiver.

FIG. 6 illustrates an embodiment of the method for reducing time to first fix (TTFF) in the satellite navigation receiver. Real time, hot start of the global navigation satellite system (GNSS) can be achieved by having a data channel onboard geosynchronous satellites to assist fast TTFF and by having the satellite navigation receiver operate in a dual frequency mode as disclosed in the co-pending non-provisional patent application number 2011/CHE/2013 titled "Navigation Data Configuration For Optimal Time To First Fix". The third carrier frequency onboard the GNSS satellites are used for the real time, hot start of the GNSS. The third carrier frequency of the geostationary satellites is assumed for the global positioning system (GPS) aided geo-augmented navigation (GAGAN) system operation. To achieve real time positioning of the global positioning system (GPS) in 6 seconds to 8 seconds with the data transmitted from the geosynchronous satellites of the Indian regional navigational satellite system (IRNSS), multiple assumptions are made. One of the assumptions is that the satellite navigation receivers do not have any data stored as part of their internal memories. The GPS and satellite based augmentation system (SBAS) satellite navigation receivers can accommodate four additional SBAS channels. The satellite navigation receivers are equipped with algorithms and/or architectures with fast acquisition of GPS satellites, for example, automobile grade receivers with fast TTFF architecture.

The method and the system disclosed herein for reducing the time to first fix in the satellite navigation receiver provides multiple ground monitoring stations and a ground master control station. The ground monitoring stations receive 601 primary navigation signals transmitted by multiple satellites of a constellation over the first carrier frequency and the second carrier frequency. The ground monitoring stations extract 602 primary navigation data comprising ephemeris data from the received primary navigation signals. The ground monitoring stations relay 603 the extracted primary navigation data to the ground master control station. The ground monitoring stations collecting the GPS data for the GAGAN system also collect the primary navigation data and relay the collected primary navigation data to the ground master control station.

The ground master control station collates 604 the relayed primary navigation data from the ground monitoring stations to create a list of satellites visible over a predetermined geographical location. The ground master control station collates data from all the ground monitoring stations and creates a table of visible satellites, for example, over the Indian subcontinent. The ground master control station determines 605 selective ephemeris data, that is, healthy ephemeris data from the relayed primary navigation data transmitted by the visible satellites. As used herein, the term "healthy ephemeris data" refers to ephemeris data of satellites whose health field reads all zeros, indicating that the satellites are healthy. The ground master control station further generates 606 a navigation data structure configured to accommodate the selective ephemeris data.

The ground master control station transmits 607 the selective ephemeris data in the generated navigation data structure to geosynchronous satellites of the integrated satellite constellation system disclosed in the detailed description of FIG. 1, over the third carrier frequency, that is, the L1 frequency. For example, the ground master control station only uploads the healthy ephemeris data to the geosynchronous satellites as per the sequence exemplarily illustrated in FIG. 5. The geosynchronous satellites, after encoding, transmit the healthy ephemeris data at 500 samples per second (sps) over the third carrier frequency. The satellite navigation receiver parallelly receives 608 the selective ephemeris data from the geosynchronous satellites of the integrated satellite constellation system in reduced time, thereby reducing the time to first fix in the satellite navigation receiver.

Figure 7:
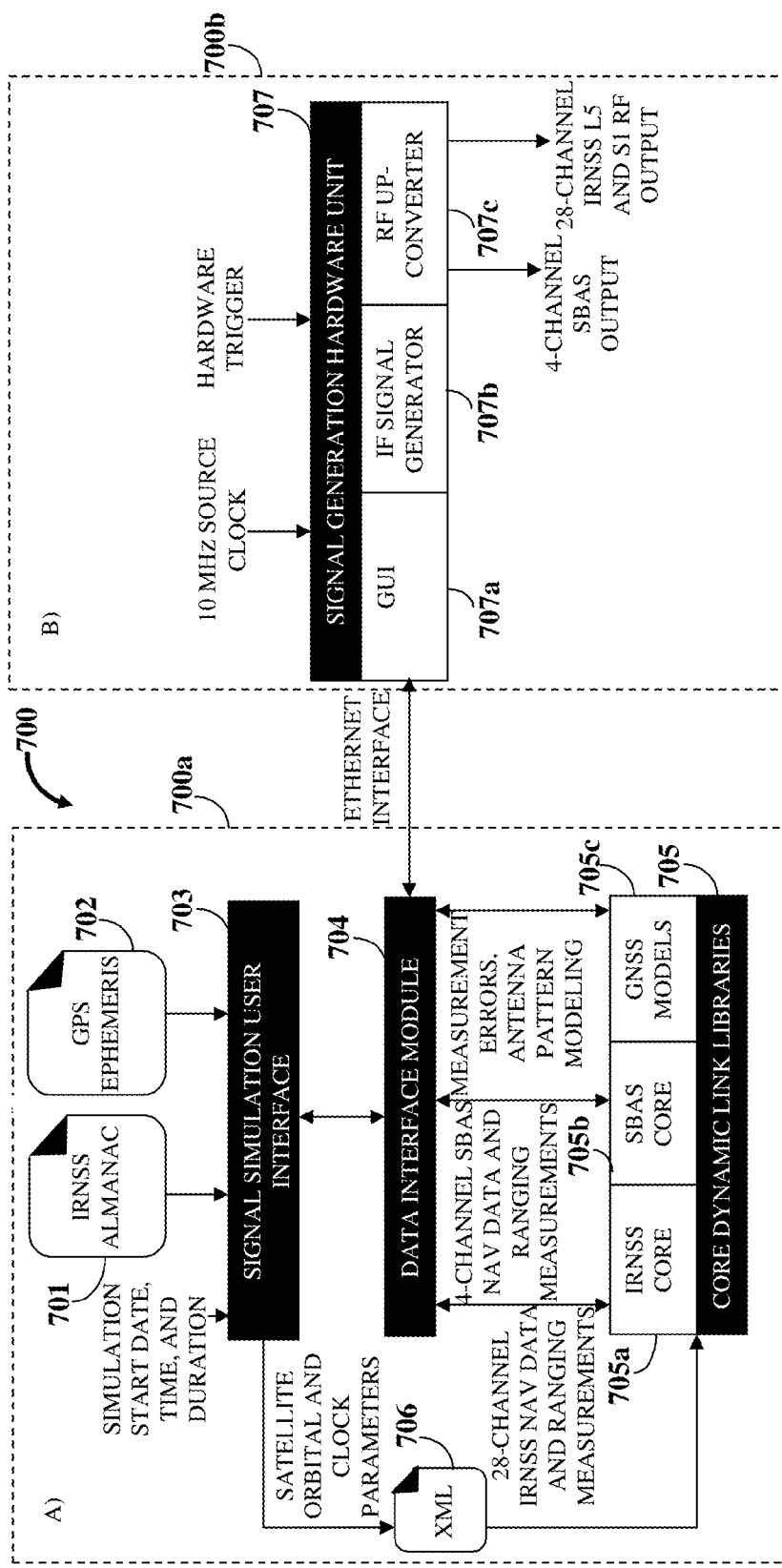
FIG. 7 exemplarily illustrates a process flow diagram comprising the steps performed by a signal generation system for generating L1 signals onboard channels of geosynchronous satellites.

FIG. 7 exemplarily illustrates a process flow diagram comprising the steps performed by a signal generation system 700 for generating L1 signals onboard channels of geosynchronous satellites, for example, the Indian regional navigational satellite system (IRNSS) geosynchronous satellites. The test setup disclosed in the co-pending non-provisional patent application number 4230/CHE/2011 titled "Satellite Navigation System For Optimal Time To First Fix Using Code And Carrier Diversity" can support 45 channels. To the 28 channels supporting the IRNSS for standard positioning service (SPS) and restricted service (RES) with L5/S1 frequency bands, 4 channels supporting the geosynchronous satellites at 500 sps for the satellite based augmentation system (SBAS), are added. The SPS and the RES modes of service are dual services supported by any global navigation satellite system (GNSS) catering to civilian and military requirements exclusively. With the requirement that the satellite channels need to operate in the L1 band, the composite intermediate frequency (IF) is translated to the L1 frequency. For the geosynchronous satellite channels, the reserved satellite identifiers (IDs) 33-36 of the GPS are used. The signal generation system 700, also referred to as a "simulator", is implemented with four geosynchronous satellite channels.

The signal generation system 700 comprises signal simulation software 700a and signal generation hardware 700b. The signal simulation software 700a comprises a signal simulation user interface 703, a data interface module 704, and core dynamic link libraries 705. The signal generation system 700 can perform signal simulation or signal generation for any given user position and time using the satellite almanac data. The signal generation system 700 supports IRNSS and SBAS signal generation. The ephemeris data of the GNSS structured as exemplarily illustrated in FIG. 5, from an external receiver and/or file is sent to an input port of the signal generation system 700. The IRNSS almanac data 701 and the global positioning system (GPS) ephemeris data 702 are communicated to the data interface module 704 via the signal simulation user interface 703. The signal simulation user interface 703 accepts the IRNSS almanac data 701 and the GPS ephemeris data 702. The signal simulation user interface 703 creates variations in the signal strength of the satellite and introduces errors, for example, on the pseudoranges.

The satellite orbital and clock parameters are converted to an extensible markup language (XML) document 706 and stored in the core dynamic link libraries 705. The data interface module 704 generates navigation data corresponding to the satellites in accordance with the interface control document (ICD) of the satellites. The navigation signal of a satellite comprises the navigation data, a code phase, and a carrier Doppler frequency component. The core dynamic link libraries 705 of the signal generation system 700 generate the code phase and the carrier Doppler frequency components of the navigation signal. The core dynamic link libraries 705 store an IRNSS core 705a, a SBAS core 705b, and GNSS models 705c for generating the code phase and the carrier Doppler frequency components of the navigation signal commensurate to each satellite relative to the user position.

The data interface module 704 retrieves 28-channel IRNSS navigation data and ranging measurements, 4-channel SBAS navigation data and ranging measurements, and measurement errors and antenna pattern models from the core dynamic link libraries 705 and communicates them to a signal generation hardware unit 707 of the signal generation hardware 700b, for example, via an Ethernet interface. The IRNSS almanac data 701 and the GPS ephemeris data 702 are encoded and transmitted to the signal generation hardware 700b section of the signal generation system 700 along with ranging measurements. The difference in the data rate of the four geosynchronous satellite channels is 500 Hz as opposed to the 100 Hz encoded IRNSS/GPS/global navigation satellite system (GLONASS). The signal generation hardware unit 707 of the signal generation hardware 700b section generates the L1 signal for the geosynchronous satellite channels. The signal generation hardware unit 707 comprises a graphical user interface (GUI) 707a, an intermediate frequency (IF) signal generator 707b, and a radio frequency (RF) up-converter 707c. The signal generation hardware unit 707 receives the IRNSS almanac data 701 and the GPS ephemeris data 702 along with ranging measurements from the data interface module 704 of the signal simulation software 700a via the GUI 707a. The GUI 707a profiles navigation data measurements, health measurements of a satellite, etc. The IF signal generator 707b generates intermediate frequency signals. The radio frequency (RF) up-converter 707c translates the intermediate frequency signals to generate L5 and S1 signals. The RF up-converter 707c generates a 4-channel SBAS output and a 28-channel IRNSS L5 and S1 RF output.

Figure 8:
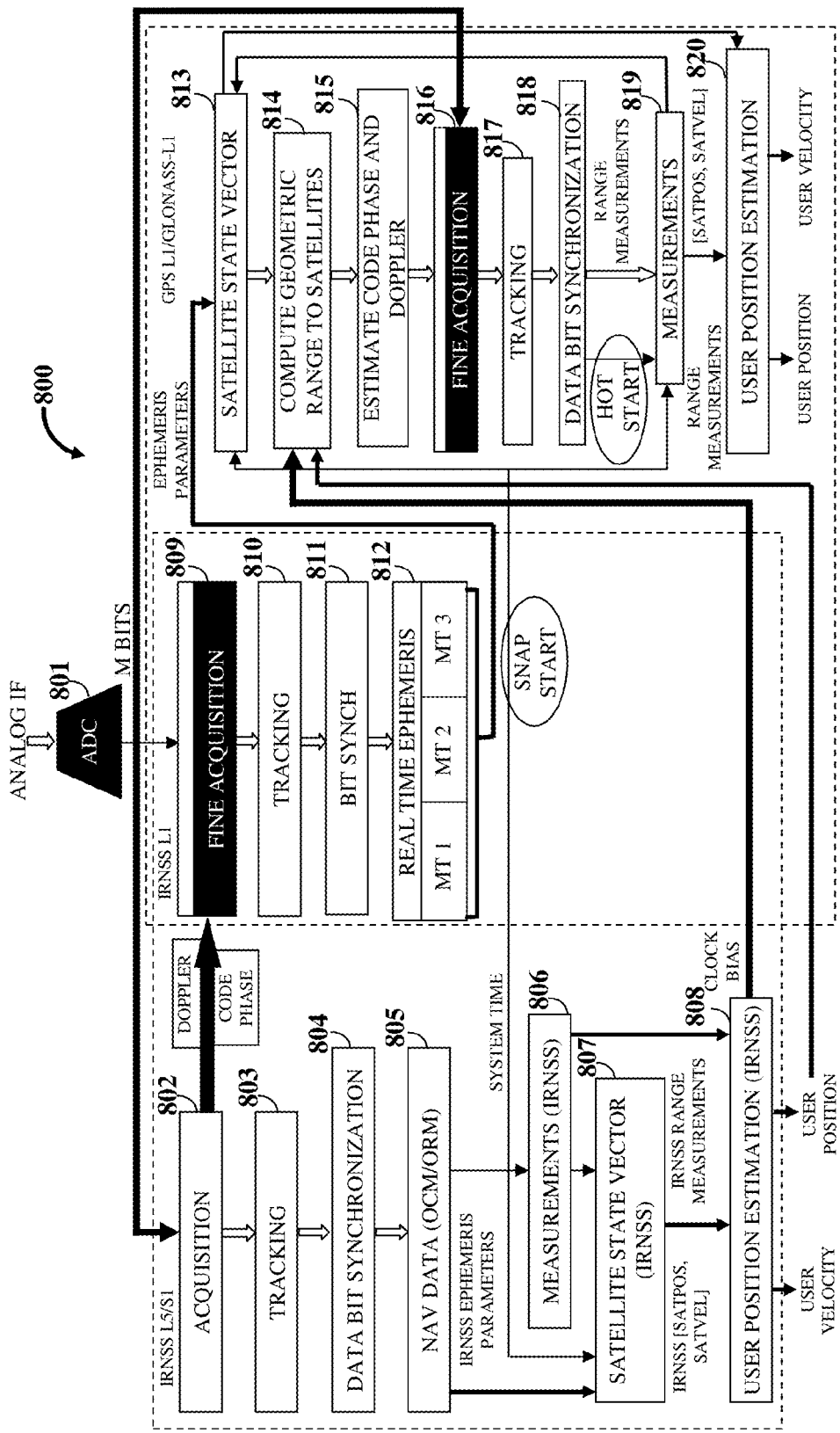
FIG. 8 exemplarily illustrates a process flow diagram comprising the steps performed by the satellite navigation receiver for achieving hot start of a global positioning system or a global navigation satellite system in real time using the third carrier frequency on geosynchronous satellites.

FIG. 8 exemplarily illustrates a process flow diagram comprising the steps performed by the satellite navigation receiver 800 for achieving hot start of a global positioning system (GPS) or a global navigation satellite system (GLONASS) in real time using the third carrier frequency on geosynchronous satellites. FIG. 8 exemplarily illustrates a generic architecture of the satellite navigation receiver 800 with the optimal civilian mode (OCM) and the optimal restricted mode (ORM) method of positioning in the Indian regional navigational satellite system (IRNSS) satellite navigation receiver 800 as disclosed in the co-pending non-provisional patent application number 2011/CHE/2013 titled "Navigation Data Configuration For Optimal Time To First Fix". The method for achieving hot start disclosed herein is presented for the GPS satellite system, which is also applicable to the GLONASS system. The IRNSS satellite navigation receiver 800 operating in the OCM mode tracks 803 and acquires 802 the navigation signals via an analog to digital converter (ADC) 801 of the satellite navigation receiver 800. During acquisition 802, which is a detection process, the IRNSS satellite navigation receiver 800 determines a satellite's availability based on the coarse estimates of code phase and the carrier Doppler frequency components of the navigation signal. Based on the acquisition, the IRNSS satellite navigation receiver 800 continuously and precisely locks the satellite to generate measurements and extract the navigation data. The IRNSS satellite navigation receiver 800 performs extraction of the navigation data from the satellite signals or the navigation signals while tracking 803 the navigation signal. Tracking 803 is typically performed on the civilian GNSS signals.

A navigation data bit is typically 20 milliseconds (ms) long. However, subsequent to acquisition of the navigation data, the exact location or the navigation data bit boundary is not available. To determine the navigation data bit boundary, starting from an arbitrary instant, the IRNSS satellite navigation receiver 800 groups correlation values for 20 ms and constructs 21 sets of correlation value groups. The set with the maximum correlation value corresponds to the location where the correlation values have been integrated, which indicates the navigation data bit boundary. The other sets are integrated on either sides of the navigation data bit boundary and thus the energy is off. The set with the maximum correlation value is considered as the reference synchronization signal and the bit boundaries are initialized during data bit synchronization 804.

The IRNSS satellite navigation receiver 800 sequences the navigation data after data bit synchronization 804 as per the navigation data structure of the optimal civilian mode (OCM) method and the optimal restricted mode (ORM) method disclosed in the detailed description of co-pending non-provisional patent application 2011/CHE/2013 titled "Navigation Data Configuration For Optimal Time To First Fix". The ephemeris data is acquired from the sequenced navigation data 805. Based on the tracking information with code phase and the carrier Doppler frequency and time of week (TOW) data, the IRNSS satellite navigation receiver 800 formulates pseudorange and delta pseudoranges, which constitute the measurements 806 from the satellite. One of the components for user position estimation is the availability of the satellite position. A satellite state vector 807 estimates the satellite position based on the ephemeris data of the satellite and the TOW data. The IRNSS satellite navigation receiver 800 estimates 808 the user position from pseudoranges and satellite position, and estimates 808 the user velocity from the delta range and satellite velocity.

With data bit synchronization 804, the estimates are directly programmed onto the L1 channels to enable fine acquisition 809 and tracking 810. During fine acquisition 809, the IRNSS satellite navigation receiver 800 precisely tracks 810 and acquires a long code or a restricted signal using the TOW data. The TOW data is available with the data demodulation post tracking. Based on the TOW data, the IRNSS satellite navigation receiver 800 acquires the restricted signal. Following the fine acquisition 809 state, the IRNSS satellite navigation receiver 800 acquires, demodulates, and synchronizes navigation data from the L1 channels using bit synchronization 811. The navigation data from the L1 channels contain the real time ephemeris data 812 of the GPS satellites. With position from the OCM method and the TOW data and the ephemeris data 812 from the IRNSS L1 path, the GPS section, that is, the third RF port of the receiver software is operational and enters into a snap start mode of operation. The snap start mode refers to the mode where the estimates, for example, time, position, user clock bias and/or drift, ephemeris data, etc., are available within the satellite navigation receiver 800.

The satellite state vector 813 estimates the satellite position based on the real time ephemeris data 812 of the satellite and the TOW data. The satellite navigation receiver 800 computes 814 the geometric range to the satellites using the difference in the received signal strength (RSS) of the state vectors of the satellite and the user. The satellite navigation receiver 800 estimates the geometric range to the satellites based on the user position and the satellite position. The accurate TOW data is available from the first path, that is, the IRNSS L5/S1 path, and the ephemeris data is available from the second path, that is, the IRNSS L1 path. The satellite navigation receiver 800 then estimates 815 the code phase and the carrier Doppler frequency components of GPS/GLONASS L1. User position estimation 820 requires satellite state vectors and measurements 819. The satellite navigation receiver 800 performs fine acquisition 816, tracking 817, and data bit synchronization 818 to obtain range measurements 819, thereby estimating 820 the user position. The acquisition time is reduced, thereby enhancing the time to first fix (TTFF).

Figure 9:
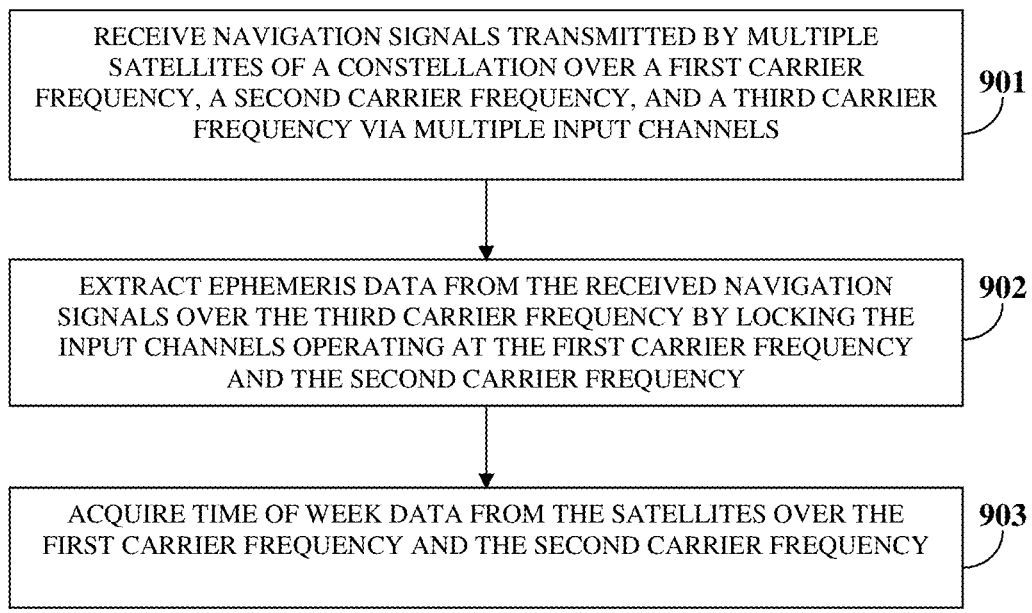
FIG. 9 illustrates an embodiment of the method for reducing time to first fix in the satellite navigation receiver.

FIG. 9 illustrates an embodiment of the method for reducing the time to first fix in the satellite navigation receiver. In this embodiment, without the optimal civilian mode (OCM) channels disclosed in the co-pending non-provisional patent application number 2011/CHE/2013 titled "Navigation Data Configuration For Optimal Time To First Fix", the global positioning system (GPS) channels are enabled post geosynchronous satellite acquisition. The satellite navigation receiver receives 901 navigation signals transmitted by multiple satellites of a constellation over the first carrier frequency, the second carrier frequency, and the third carrier frequency via multiple input channels. Each of the navigation signals is configured to accommodate navigation data comprising ephemeris data and time of week (TOW) data. The satellite navigation receiver extracts 902 ephemeris data from the received navigation signals over the third carrier frequency by locking the input channels operating at the first carrier frequency and the second carrier frequency. The satellite navigation receiver acquires 903 the TOW data from the satellites over the first carrier frequency and the second carrier frequency. The extraction of the ephemeris data over the third carrier frequency and the acquisition of the TOW data over the first carrier frequency and the second carrier frequency reduce the time to first fix in the satellite navigation receiver.

The method disclosed herein follows a conventional acquisition of the GPS satellites and obtains the ephemeris data from the third carrier frequency of the Indian regional navigational satellite system (IRNSS). This enables the GPS satellites to enter the hot start positioning mode. With power-on, all the three channels of the IRNSS, that is, L5, S1, and L1 are exposed to the navigation signals. With the acquisition of one of the paths, the other carrier frequencies are directly locked. This ensures that the ephemeris data of the GPS is collected on the third carrier frequency, that is, the L1 frequency. The GPS section also enters into acquisition and collects the navigation data to obtain the TOW data from the satellites. With the ephemeris data and the TOW data from the satellites, the GPS section makes measurements and thus estimates the user position. Subsequent to bit and/or sub-frame synchronization of the GPS channels and with the navigation data from the geosynchronous satellites, position estimation of the GPS section is enabled. The method disclosed herein does not depend on the IRNSS channels. With the additional four satellite based augmentation system (SBAS) channels on the GPS+SBAS receiver, the navigation data of visible satellites are obtained to accomplish the time to first fix (TTFF).

Figure 10:
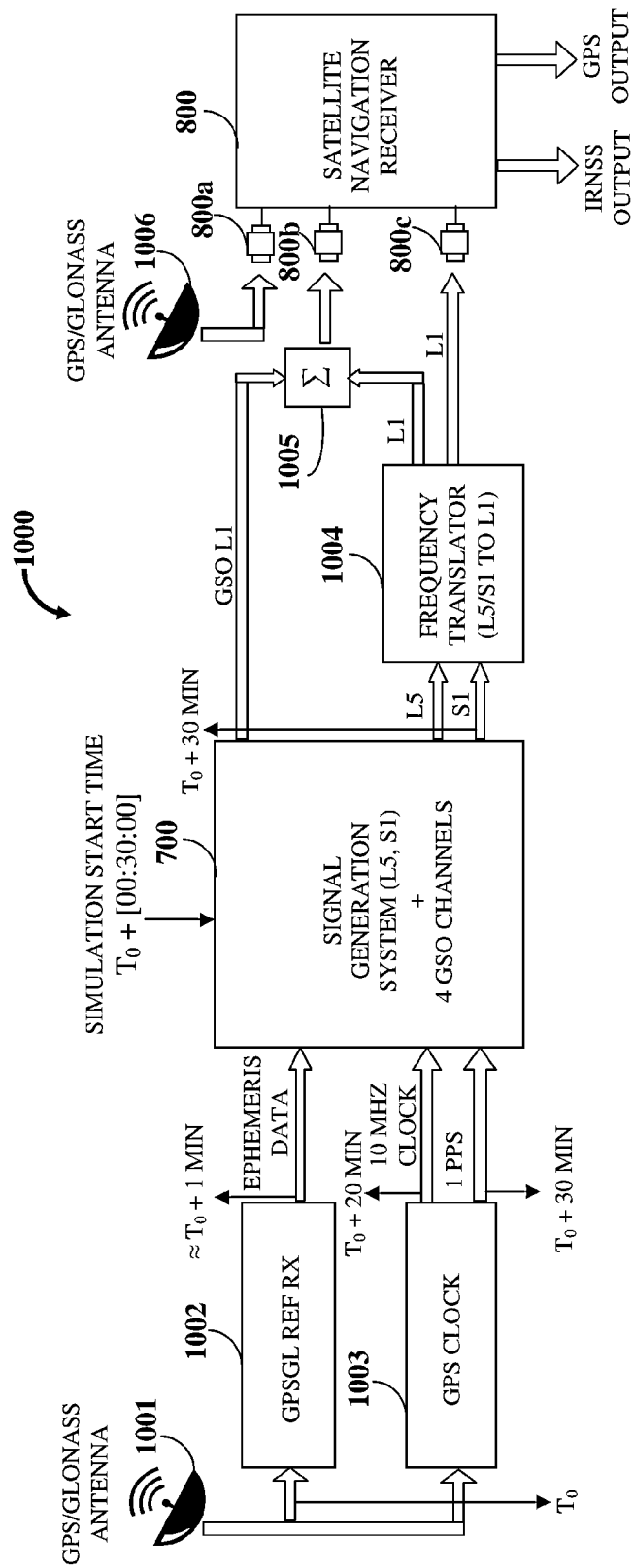
FIG. 10 exemplarily illustrates a block diagram showing a test apparatus used for generating and transmitting navigation signals to the satellite navigation receiver.

FIG. 10 exemplarily illustrates a block diagram showing a test apparatus 1000 used for generating and transmitting navigation signals to the satellite navigation receiver 800. The test apparatus 1000 enables simulation of the global navigation satellite system hot start performance with the Indian regional navigational satellite system (IRNSS). The test apparatus 1000 comprises global positioning system (GPS) and/or global navigation satellite system (GLONASS) antennas 1001 and 1006 exposed to open sky conditions, a GPS GLONASS (GPSGL) reference receiver 1002, a GPS clock (GPSCLK) unit 1003, a signal generation system 700 also referred to as a "simulator", a frequency translator 1004, and the satellite navigation receiver 800 configured as a GPSGL modified receiver. The output from the GPS/GLONASS antenna 1001 is fed to the GPSGL reference receiver 1002 and the GPSCLK unit 1003 through a splitter. The GPSGL reference receiver 1002 acquires and tracks all the satellites and the output ephemeris data along with other receiver parameters. The GPSGL reference receiver 1002 acquires, tracks, and collects the navigation data, which in turn is relayed to the signal generation system 700. The GPSCLK unit 1003 is a rubidium (Rb) based timing unit housing a GPS receiver (not shown). The GPSCLK unit 1003 provides high accuracy measurements, for example, filtered code phase information. The second output from the splitter is connected to the GPS receiver inside the GPSCLK unit 1003.

The output from the GPSGL reference receiver 1002 is fed to the signal generation system 700 comprising 4 geosynchronous (GSO) channels as disclosed in the co-pending non-provisional patent application number 4230/CHE/2011 titled "Satellite Navigation System For Optimal Time To First Fix Using Code And Carrier Diversity", in real time for the generation of navigation data of the geosynchronous satellites. The ephemeris data of the GPS satellites whose health field reads all zeros, indicating healthy, are transmitted to the signal generation system 700 at about $T_0+1$ minute, to ensure that the bandwidth is optimized. The signal generation system 700 is configured to receive the ephemeris data in real time and store the ephemeris data as part of its memory (not shown) prior to the start of the simulation. The data from the GPSGL reference receiver 1002 is collected on a port of the signal generation system 700 and stored.

The GPSCLK unit 1003 is powered on at $T_0$ and allowed to warm up. The GPSGL reference receiver 1002 is powered on at the same time as the GPSCLK unit 1003. The GPS receiver in the GPSCLK unit 1003 generates precise measurements in a position constrained mode to output an accurate 1 pulse per second (pps) signal. The 1 pps signal trigger is programmed for $T_0+30$ minutes from power on. The GPSCLK unit 1003, in a standalone mode, generates the 1 pps signal, which initially is not referenced. The rubidium oscillator (not shown) of the GPSCLK unit 1003 is reset using the 1 pps signal from the GPS receiver using adequate averaging. The 1 pps signal from the GPSCLK unit 1003 is in phase lock with GPS time. In addition, a phase locked 10 megahertz (MHz) signal is also output from the GPSCLK unit 1003. This 10 MHz signal is connected to an external 10 MHz input port of the signal generation system 700. The GPSCLK unit 1003 outputs the 1 pps signal for any programmed instant, which is connected to a hardware trigger input port of the signal generation system 700. The GPSCLK unit 1003 outputs the phase locked 10 MHz signal at around $T_0+20$ minutes to the signal generation system 700. The GPSCLK unit 1003 outputs the 1 PPS signal at $T_0+30$ minutes to the signal generation system 700 enabling the radio frequency (RF) signal generation.

The signal generation system 700 is also powered on around $T_0$ and the simulation start time is set to $T_0+30$ minutes, commensurate with the trigger instant set on the GPSCLK unit 1003. The signal generation system 700 generates a composite L5-S1-L1 radio frequency signal for transmission to the satellite navigation receiver 800. The composite L5-S1-L1 radio frequency signal comprises the 7-channel IRNSS signal at the L5 frequency with coarse/acquisition (C/A) codes 1 to 7, the 7-channel IRNSS signal at the S1 frequency with C/A codes 8 to 14, and the 3-channel IRNSS signal at the L1 frequency with C/A codes 33 to 35. The first seven channels of the signal generation system 700 on S1/L5 simulate the IRNSS constellation signals with respect to the standard positioning service (SPS). The first four channels of the restricted service (RES) are modified on the S1 port and dedicated for geosynchronous satellites. The simulations or the position set in the signal generation system 700 correspond to the GPS/GLONASS antenna 1001 exposed to clear sky. With the 1 pps signal, the IRNSS simulation signals are generated in a phase locked condition with that of the GPS, and the satellite navigation receiver 800 is configured to acquire the navigation data on the L5 and S1 channels.

The navigation signals over the first carrier frequency, that is, the L5 frequency and the second carrier frequency, that is, the S1 frequency are fed to a frequency translator 1004 from the signal generation system 700. The frequency translator 1004 translates the navigation signals over the L5 frequency and the S1 frequency to a navigation signal over the third carrier frequency, that is, the L1 frequency. The satellite navigation receiver 800 is powered on at around $T_0$. With no RF input, the satellite navigation receiver 800 is in search mode. The GPS channels are configured to enable the GPS channels to enter acquisition only after one of the IRNSS standard positioning service (SPS) channels, that is, the IRNSS L5 and S1 channels are acquired. This configuration of the GPS channels provides a reference to estimate hot start performance of the satellite navigation receiver 800.

The satellite navigation receiver 800 has three radio frequency (RF) ports 800a, 800b, and 800c as disclosed in the co-pending non-provisional patent application number 4230/CHE/2011 titled "Satellite Navigation System For Optimal Time To First Fix Using Code And Carrier Diversity". The input to the RF port 800c is from the L5/S1 signal translated to L1 received from the frequency translator 1004. The input to the other RF port 800b is obtained from a combiner 1005 whose inputs are from the frequency translator 1004 and GSO channels. The input to the other RF port 800a is from the live GPS antenna 1006 exemplarily illustrated in FIG. 10. With the OCM method and in post bit-synchronization, the satellite navigation receiver 800 estimates position within 6 seconds. These estimates are programmed to the GPS L1 channels. The satellite navigation receiver 800 acquires, tracks, and uses these estimates for computing the position in 2 seconds to 3 seconds.

Figure 11:
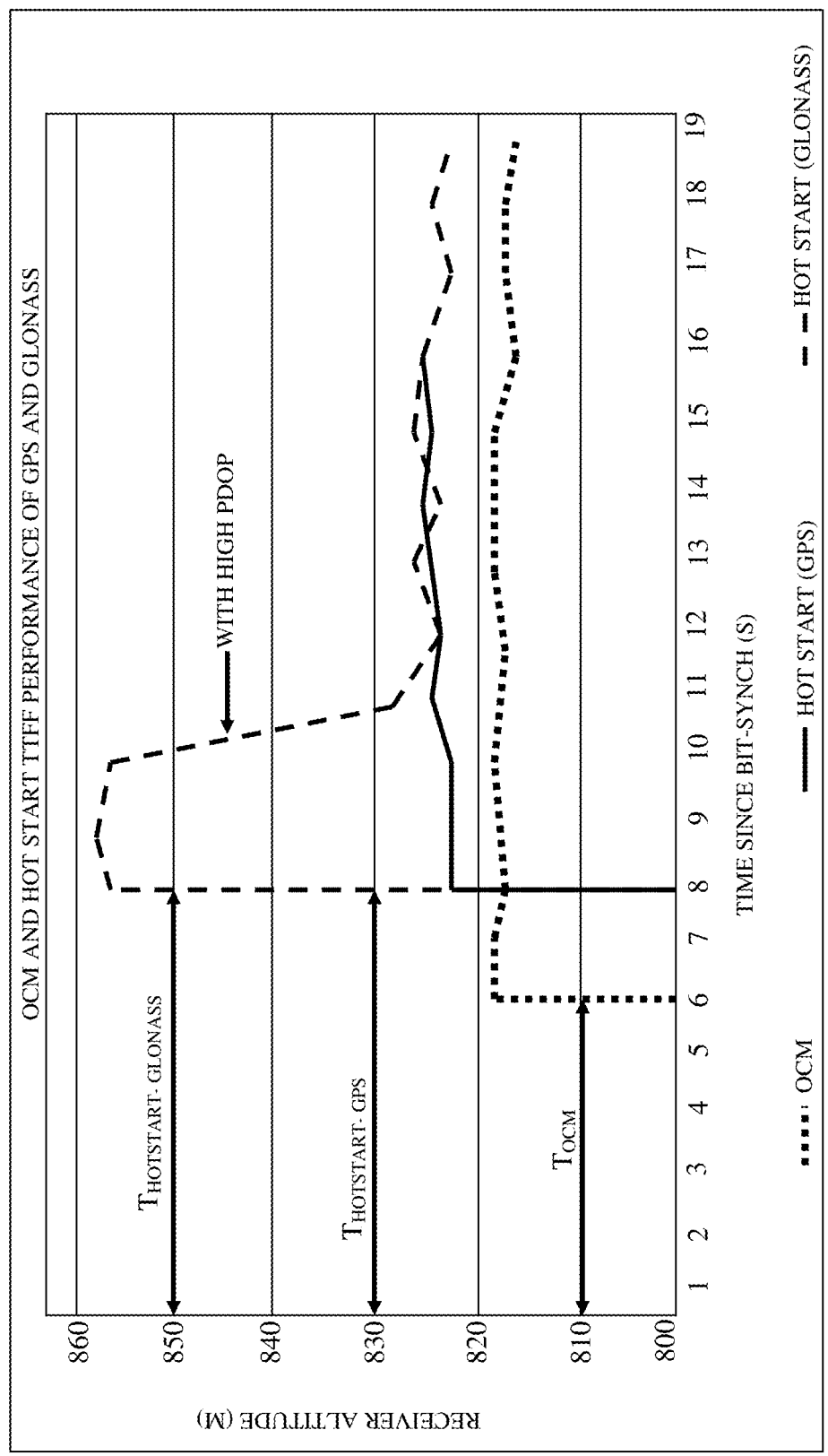
FIG. 11 exemplarily illustrates a graphical representation showing time to first fix test results in a hot start mode of operation of the Indian regional navigational satellite system and the global positioning system.

FIG. 11 exemplarily illustrates a graphical representation showing time to first fix (TTFF) test results in a hot start mode of operation of the Indian regional navigational satellite system (IRNSS) and the global positioning system (GPS). The tests are conducted over multiple iterations using the test apparatus 1000 exemplarily illustrated in FIG. 10, and the worst case result is plotted in FIG. 11. The analysis is as follows: The GPS ephemeris data is collected from the L1 path of the IRNSS. The navigation (NAV) data structure used on the L1 path is similar to the satellite based augmentation system (SBAS) with each frame accommodating a maximum of 250 bits without forward error correction (FEC). With 488 bits in the navigation data structure as disclosed in the detailed description of FIG. 5, it takes 3 sub-frames with 500 sps to transmit ephemeris data as part of the navigation data structure. With a geosynchronous satellite transmitting GPS ephemeris data once every 3 seconds, it takes 9 seconds to transmit the ephemeris data of 12 visible GPS satellites as exemplarily illustrated in FIG. 13. However, if the initial lock on the geosynchronous satellite occurs on the second sub-frame of the first set, it will take an additional 3 seconds, that is, 12 seconds overall to transmit the ephemeris data. The first position of the GPS is determined with a relatively high positional dilution of precision (PDOP) in some test iterations. After an additional 3 seconds, the ephemeris data was obtained from four additional satellites, eight in all, which resulted in a reduced or improved PDOP. For either method with or without the optimal civilian mode (OCM), the TTFF performance was similar and the results along with the OCM method of the IRNSS are exemplarily illustrated in FIG. 11. The problems observed in the GPS with 340 navigation data bits in the first four strings of the navigation data is not observed in global navigation satellite systems (GLONASSs) with 488 data bits. This reduces three sub-frames and/or satellites to two. The data is communicated within 6 seconds for eight satellites. With the OCM of positioning, the GLONASS entered into a measurement mode and provided the position within 8 seconds from the instant of geosynchronous satellite bit synchronization as exemplarily illustrated in FIG. 11.

Figure 12:
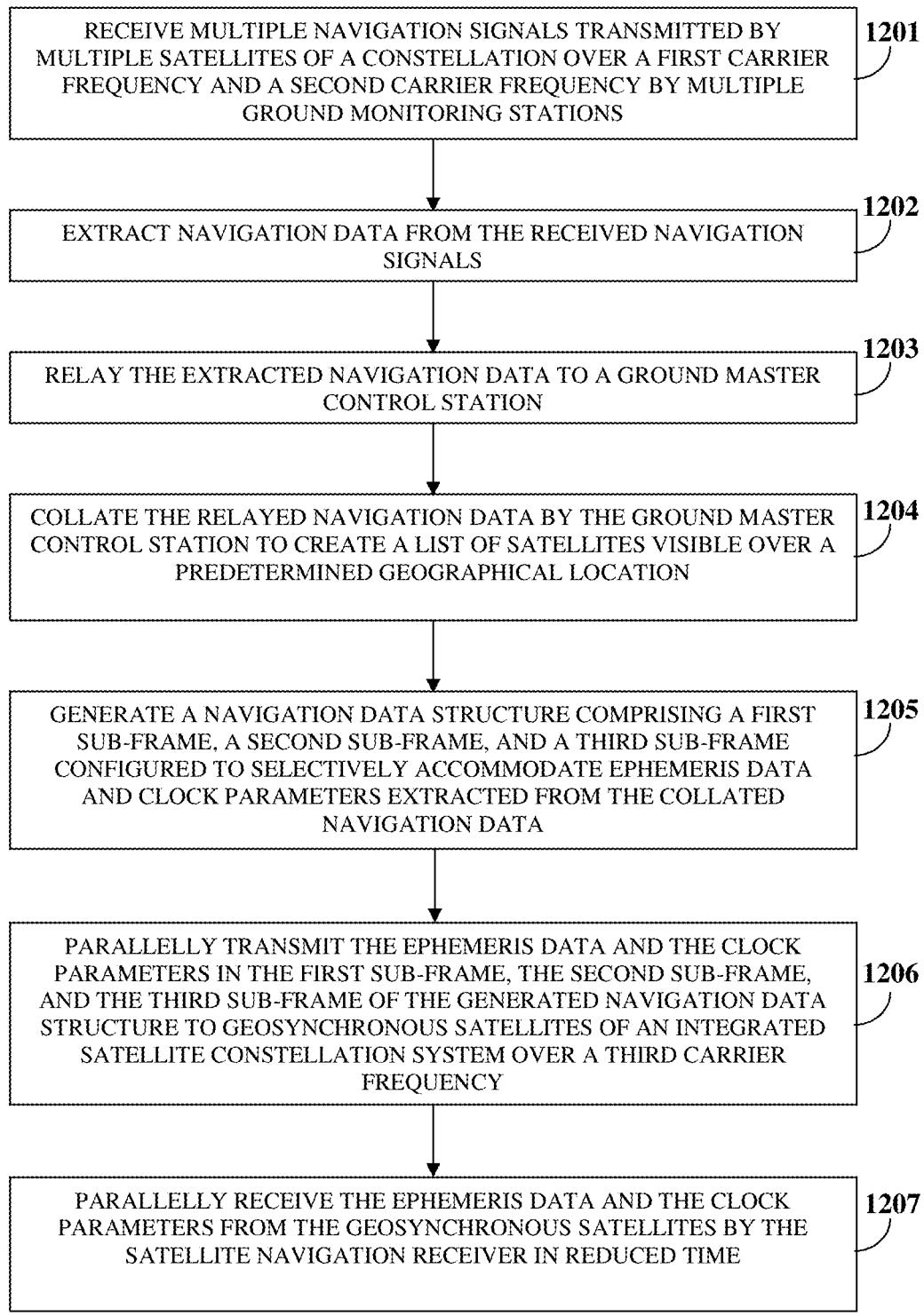
FIG. 12 illustrates an embodiment of the method for reducing time to first fix in the satellite navigation receiver.

FIG. 12 illustrates an embodiment of the method for reducing time to first fix (TTFF) in the satellite navigation receiver. The ground monitoring stations receive 1201 multiple navigation signals transmitted by multiple satellites of a constellation over the first carrier frequency, that is, the L5 frequency and the second carrier frequency, that is, S1 frequency. The ground monitoring stations extract 1202 the navigation data from the received navigation signals. The ground monitoring stations relay 1203 the extracted navigation data to the ground master control station. The ground master control station collates 1204 the relayed navigation data from the ground monitoring stations to create a list of satellites visible over a predetermined geographical location, for example, the Indian subcontinent.

The ground master control station generates 1205 a navigation data structure comprising a first sub-frame, a second sub-frame, and a third sub-frame configured to selectively accommodate ephemeris data and clock parameters extracted from the collated navigation data. That is, the ground master control station groups the data into three sub-frames to accommodate the primary parameters, that is, the ephemeris data and the clock parameters of the global positioning system (GPS) satellites. The ground master control station parallelly transmits 1206 the ephemeris data and the clock parameters in the first sub-frame, the second sub-frame, and the third sub-frame of the generated navigation data structure to geosynchronous satellites of the integrated satellite constellation system over a third carrier frequency, that is, the L1 frequency. The satellite navigation receiver parallelly receives 1207 the ephemeris data and the clock parameters from the geosynchronous satellites of the integrated satellite constellation system in reduced time, thereby reducing the TTFF in the satellite navigation receiver.

Figure 13:
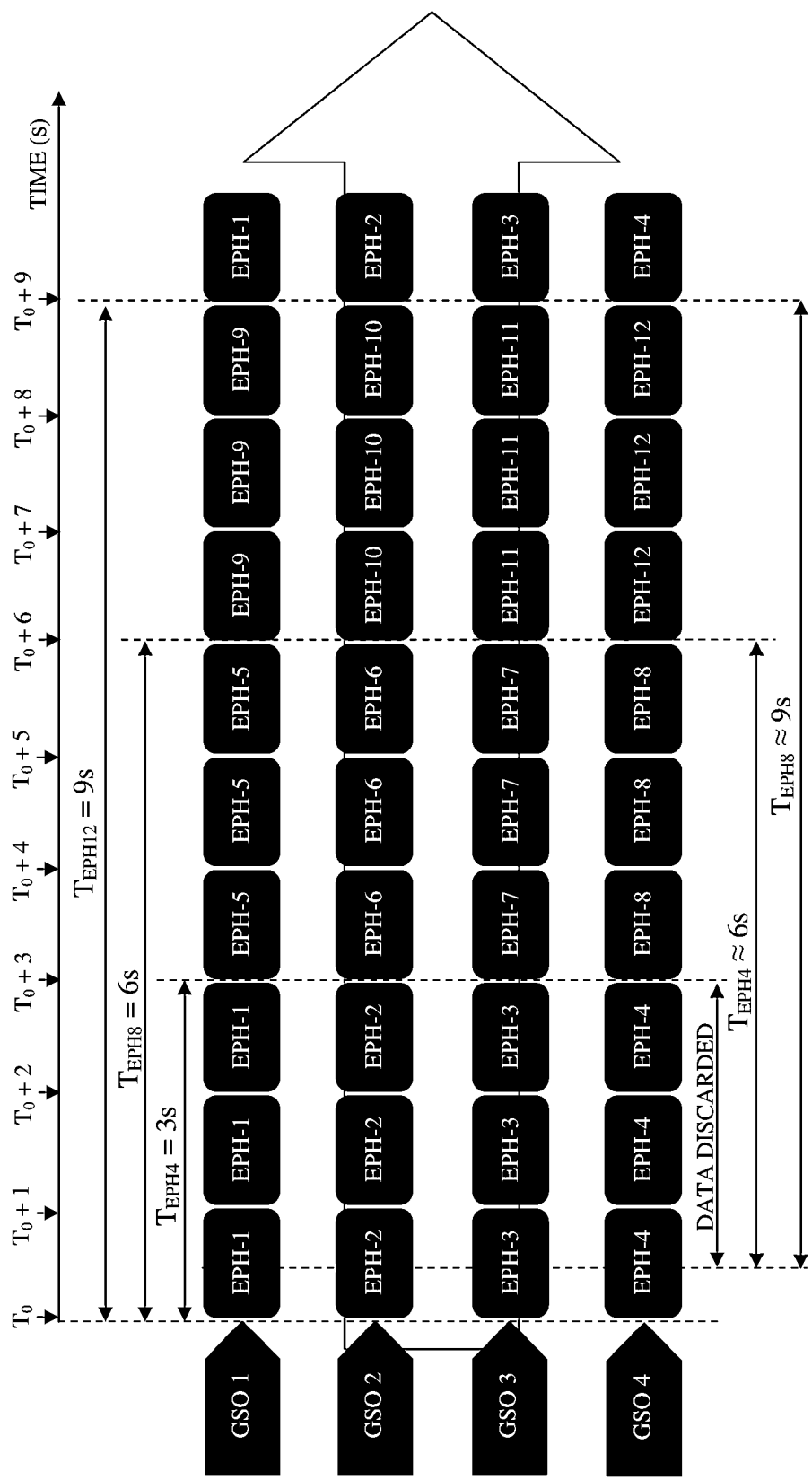
FIG. 13 exemplarily illustrates a timing diagram showing time taken to transmit navigation data of global positioning system satellites on geosynchronous satellites.

FIG. 13 exemplarily illustrates a timing diagram showing time taken to transmit navigation data of global positioning system (GPS) satellites on geosynchronous satellites. The signal transmission on the Indian regional navigational satellite system (IRNSS) L1 with respect to the navigation data of the global navigation satellite system (GNSS) is explained as follows: The ground master control station groups data collected from various ground monitoring stations and creates a database with respect to the visible satellites as disclosed in the detailed description of FIG. 12. The navigation data structure is transmitted on the third carrier frequency of the IRNSS L1 and only from the 4 geosynchronous satellites. Each sub-frame of the navigation data structure is transmitted within 1 second. Therefore, it takes 3 seconds to transmit the ephemeris data of one GPS satellite from a geosynchronous IRNSS satellite. Thus, within 3 seconds, the ephemeris data of four GPS satellites is transmitted. After 3 seconds, the ephemeris data for the next set of satellites in the database is transmitted. This process repeats till all the ephemeris data of the GPS is transmitted. Subsequently, the entire process repeats.

Figure 14:
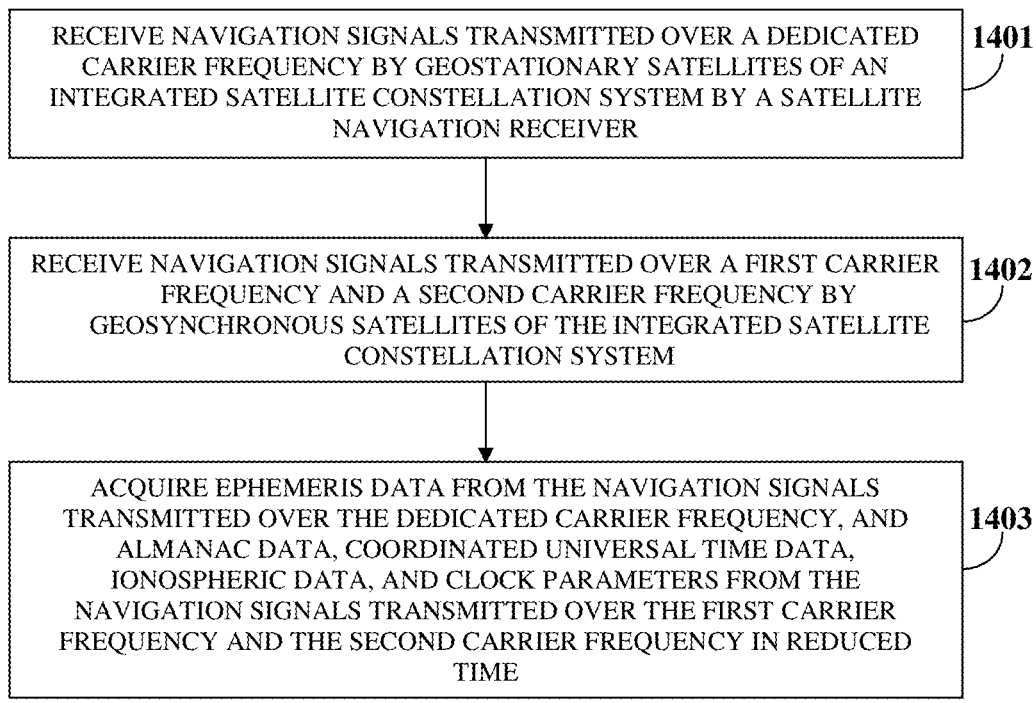
FIG. 14 illustrates an embodiment of the method for reducing time to first fix during a snap start mode of the satellite navigation receiver.

FIG. 14 illustrates an embodiment of the method for reducing time to first fix (TTFF) during a snap start mode of the satellite navigation receiver. The hot start analysis as disclosed in the detailed descriptions of FIG. 4, FIG. 6, and FIGS. 7-9 show that any further improvement in the TTFF of the Indian regional navigational satellite system (IRNSS) can be achieved with an increase in data rate. In this embodiment for optimizing the TTFF of the IRNSS restricted service, assumptions are made as follows: A dedicated frequency signal is available only to restricted users of the IRNSS with data at 1 KHz and signal strength of −157 decibel Watt (dBW); the dedicated frequency signal is present only on the geostationary satellites of the IRNSS; and to reduce the bandwidth of the data exchanged, the IRNSS parameters are transmitted as absolute state vectors as in global navigation satellite system (GLONASS) on this frequency channel.

In the optimal restricted mode (ORM) method disclosed herein, the satellite navigation receiver receives 1401 navigation signals transmitted over a dedicated carrier frequency by geostationary satellites of the integrated satellite constellation system. In this embodiment, the satellite navigation receiver is operating in a restricted mode. The navigation signals transmitted over the dedicated carrier frequency are configured for a predetermined frequency and a predetermined signal strength. The dedicated carrier frequency is a 1 KHz frequency signal and has a signal strength of −157 decibel-watt (dBW). The satellite navigation receiver receives 1402 navigation signals transmitted over the first carrier frequency and the second carrier frequency by the geosynchronous satellites of the integrated satellite constellation. The satellite navigation receiver acquires 1403 ephemeris data from the navigation signals transmitted over the dedicated carrier frequency, and almanac data, coordinated universal time (UTC) data, ionospheric data, and clock parameters from the navigation signals transmitted over the first carrier frequency and the second carrier frequency in reduced time, thereby reducing the TTFF in the satellite navigation receiver.

With time information available within 3 seconds employing the ORM method in the IRNSS as disclosed in the co-pending non-provisional patent application number 2011/CHE/2013 titled "Navigation Data Configuration For Optimal Time To First Fix", from the instant of tracking the standard positioning service (SPS) channels as a pointer, the respective restricted code and the 1 KHz dedicated frequency channel are locked. The ephemeris data is available within 1 second from the 1 KHz channel and based on the measurements from the restricted signal post fine acquisition and bit synchronization, the position is estimated. The ephemeris data is transmitted as exemplarily illustrated in FIG. 13. The result is a TTFF of 4 seconds to 5 seconds, 3 seconds for time and 1 second to 2 seconds for measurements and/or ephemeris data and/or positioning for the restricted service. This formulation assumes SPS assistance as disclosed in the co-pending non-provisional patent application number 2011/CHE/2013 titled "Navigation Data Configuration For Optimal Time To First Fix" to obtain time of week (TOW), independent of the third carrier frequency L1 channel, and requires an encrypted data channel.

Figure 15:
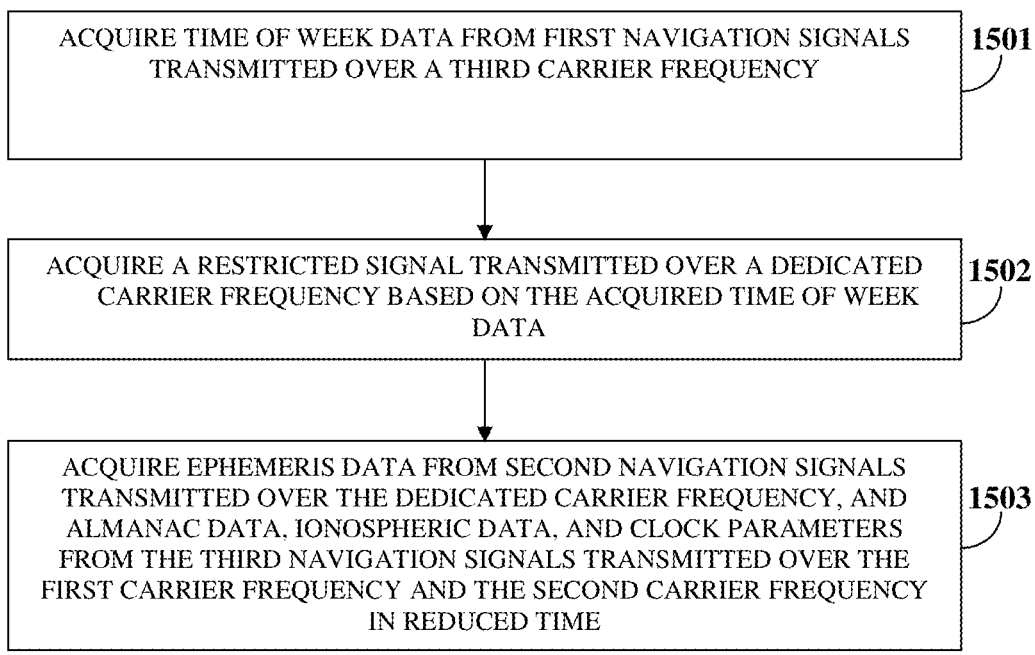
FIG. 15 illustrates an embodiment of the method for reducing time to first fix during the snap start mode of the satellite navigation receiver.

FIG. 15 illustrates an embodiment of the method for reducing time to first fix (TTFF) during the snap start mode of the satellite navigation receiver. The satellite navigation receiver acquires 1501 time of week (TOW) data from first navigation signals transmitted over a third carrier frequency, for example, the L1 frequency. In this embodiment, the satellite navigation receiver is operating in a restricted mode. The satellite navigation receiver acquires 1502 a restricted signal transmitted over a dedicated carrier frequency at 1 KHz based on the acquired TOW data. The satellite navigation receiver acquires 1503 ephemeris data from second navigation signals transmitted over the dedicated carrier frequency, and almanac data, ionospheric data, and clock parameters from third navigation signals transmitted over the first carrier frequency and the second carrier frequency in reduced time, thereby reducing the time to first fix in the satellite navigation receiver.

Assuming the disclosed third carrier frequency, that is, the L1 frequency, on all the satellites, the TOW data is available to the satellite navigation receiver within 1 second of tracking. The third frequency is defined by the Indian regional navigational satellite system (IRNSS) on global positioning system (GPS) aided geo-augmented navigation (GAGAN) system and the third carrier frequency on the IRNSS geosynchronous satellites. The TOW data is used as a pointer to acquire the restricted signal and the 1 KHz data channel. In this embodiment, the TTFF is about 3 seconds to 4 seconds for restricted users, that is, 1 second for fine acquisition of the L1 channel, 1 second for fine acquisition of the restricted and 1 KHz channel, and 1 second to 2 seconds to obtain the ephemeris data and/or measurement and/or position estimation.

In another embodiment, an assumption on the availability of time is implicitly performed in the optimal civilian mode (OCM) in restricted direct acquisition as disclosed in the co-pending non-provisional patent application number 2011/CHE/2013 titled "Navigation Data Configuration For Optimal Time To First Fix". With this input, that is, the TOW data from the L1 channel of the IRNSS in 1 second, the results of the ORM method disclosed in the co-pending non-provisional patent application number 2011/CHE/2013 titled "Navigation Data Configuration For Optimal Time To First Fix" are achievable, which translates to 4 seconds positioning on the restricted service: 1 second for L1 and 3 seconds for data collection. The time is obtained from the third frequency, that is, the L1 frequency of the IRNSS. With this as input, the restricted service can accomplish direct acquisition within 4 seconds. Positioning of the restricted users of the IRNSS is accomplished using the OCM method. With this approach, the 1 KHz channel is obviated and yet restricted and civilian positions are obtained in 4 seconds and 6 seconds, respectively, post bit synchronization. Using the method disclosed herein, a user can obtain the TTFF for the restricted service faster than standard positioning service (SPS) users and without needing the assumed 1 KHz signal. However, the method disclosed herein assumes that the L1 channel is available on all the IRNSS satellites.

Figure 16:
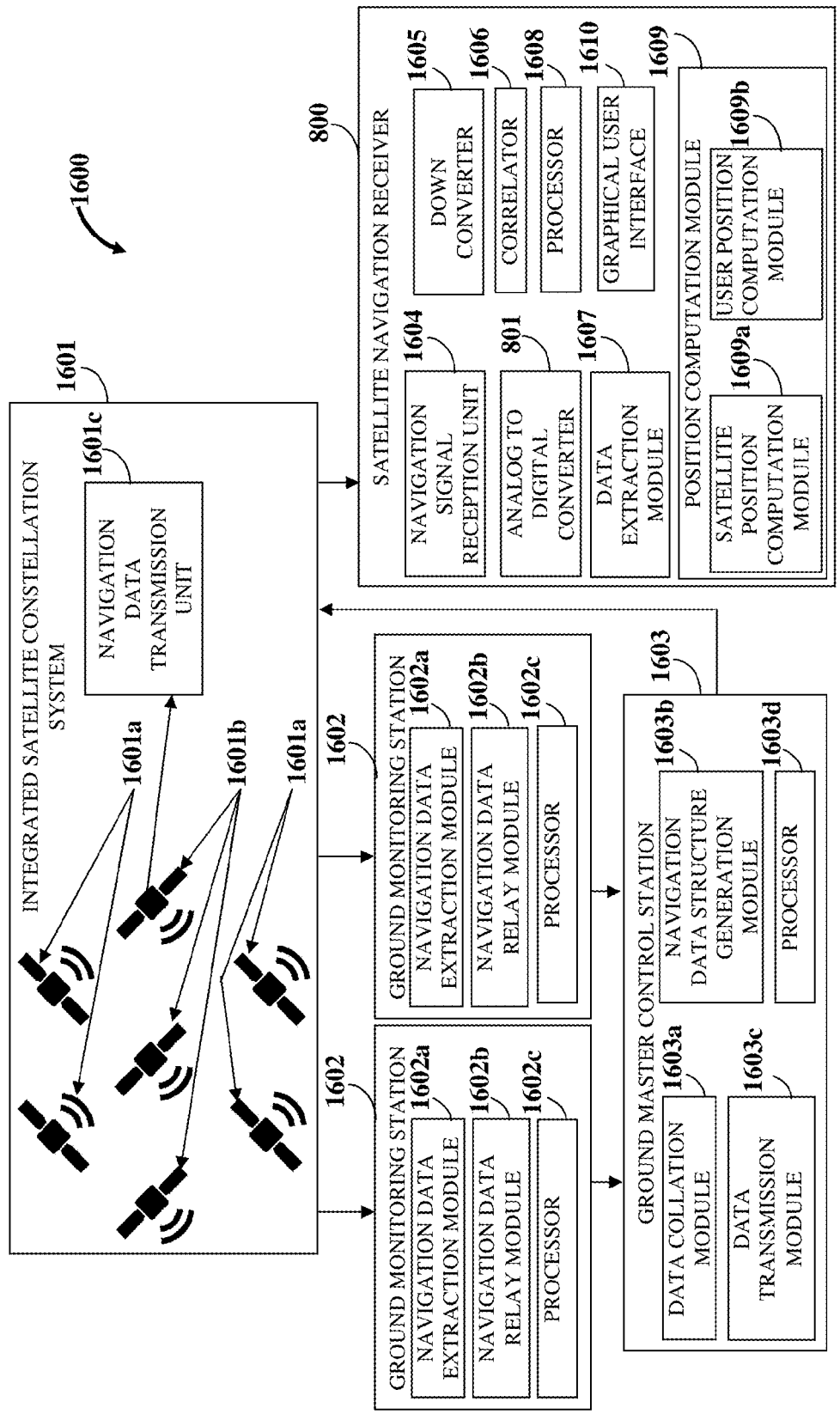
FIG. 16 exemplarily illustrates a system for reducing time to first fix in the satellite navigation receiver.

FIG. 16 exemplarily illustrates a system 1600 for reducing time to first fix in a satellite navigation receiver 800. The system 1600 disclosed herein comprises an integrated satellite constellation system 1601 for transmitting navigation signals comprising navigation data over a combination of a first carrier frequency, a second carrier frequency, and a third carrier frequency. The integrated satellite constellation system 1601 comprises a predetermined number of geosynchronous satellites 1601a operating in the first carrier frequency and the second carrier frequency and positioned at first predetermined geographic coordinates in a geosynchronous orbit, and a predetermined number of geostationary satellites 1601b operating in the third carrier frequency and positioned at second predetermined geographic coordinates in a geostationary orbit among the predetermined number of the geosynchronous satellites 1601a as disclosed in the detailed description of FIG. 1. The integrated satellite constellation system 1601 further comprises a navigation data transmission unit 1601c for parallelly transmitting sub-frames of navigation data to the satellite navigation receiver 800 over the combination of the first carrier frequency, the second carrier frequency, and the third carrier frequency in reduced time, thereby reducing the time to first fix in the satellite navigation receiver 800. The navigation data transmission unit 1601c is implemented in each of the satellites 1601a and 1601b of the integrated satellite constellation system 1601.

The satellite navigation receiver 800 comprises a navigation signal reception unit 1604 for parallelly receiving the navigation signals from the satellites 1601a and 1601b of the integrated satellite constellation system 1601 via multiple input channels. Each of the navigation signals comprises sub-frames configured to selectively accommodate navigation data. The navigation signal reception unit 1604 receives each of the sub-frames of navigation data from the navigation signals via one of the input channels. The satellite navigation receiver 800 further comprises at least one processor 1608 and a non-transitory computer readable storage medium communicatively coupled to the processor 1608. The non-transitory computer readable storage medium is configured to store modules 801, 1605, 1606, 1607, and 1609 of the satellite navigation receiver 800. The processor 1608 executes the modules, for example, 801, 1605, 1606, 1607, and 1609 of the satellite navigation receiver 800. The satellite navigation receiver 800 further comprises a down converter 1605, an analog to digital converter 801, a correlator 1606, and a position computation module 1609. The radio frequency down converter 1605 converts the received radio frequency navigation signals to intermediate frequency (IF) signals. The analog to digital converter 801 converts the intermediate frequency signals to digital samples. The correlator 1606 correlates the digital samples of the navigation signal with locally generated signals, for example, reference digital samples. This enables data bit demodulation and further decoding of the navigation data structure.

The satellite navigation receiver 800 further comprises a data extraction module 1607 for extracting ephemeris data, ionospheric data, coordinated universal time (UTC) data, and textual data from the sub-frames of navigation data of each of the navigation signals. The data extraction module 1607 defines instructions for extracting the ephemeris data from the navigation signals transmitted over the third carrier frequency. The data extraction module 1607 further defines instructions for extracting the ionospheric data, the UTC data, and the textual data from the navigation signals transmitted over the first carrier frequency and the second carrier frequency. The navigation signal reception unit 1604 parallelly acquires the ephemeris data, the ionospheric data, the coordinated universal time data, and the textual data over the first carrier frequency, the second carrier frequency, and the third carrier frequency, thereby reducing the time to first fix in the satellite navigation receiver 800.

In an embodiment, the navigation signal reception unit 1604 of the satellite navigation receiver 800 receives the navigation signals transmitted by the satellites of the constellation over the first carrier frequency, the second carrier frequency, and the third carrier frequency via the input channels. Each navigation signal accommodates the navigation data comprising the ephemeris data and the time of week data. In this embodiment, the data extraction module 1607 of the satellite navigation receiver 800 defines instructions for extracting the ephemeris data from the received navigation signals over the third carrier frequency by locking the input channels operating at the first carrier frequency and the second carrier frequency. In this embodiment, the navigation signal reception unit 1604 of the satellite navigation receiver 800 acquires the time of week data from the satellites over the first carrier frequency and the second carrier frequency.

In an embodiment, the data extraction module 1607 of the satellite navigation receiver 800 defines instructions for acquiring time of week data from first navigation signals transmitted over the third carrier frequency. The data extraction module 1607 further defines instructions for acquiring a restricted signal transmitted over a dedicated carrier frequency based on the acquired time of week data. The data extraction module 1607 further defines instructions for acquiring the ephemeris data from second navigation signals transmitted over the dedicated carrier frequency, and almanac data, the ionospheric data, and clock parameters from third navigation signals transmitted over the first carrier frequency and the second carrier frequency in reduced time, thereby reducing the time to first fix in the satellite navigation receiver 800. The processor 1608 of the satellite navigation receiver 800 retrieves the instructions defined by the data extraction module 1607 and executes the instructions, thereby performing one or more processes defined by those instructions.

The system 1600 disclosed herein further comprises multiple ground monitoring stations 1602 for receiving primary navigation signals transmitted by multiple satellites of a constellation over the first carrier frequency and the second carrier frequency, and a ground master control station 1603. Each of the ground monitoring stations 1602 comprises modules 1602a and 1602b executable by at least one processor 1602c. Each of the ground monitoring stations 1602 comprises a navigation data extraction module 1602a and a navigation data relay module 1602b. The navigation data extraction module 1602a defines instructions for extracting primary navigation data comprising the ephemeris data from the received primary navigation signals. The navigation data relay module 1602b defines instructions for relaying the extracted primary navigation data to a ground master control station 1603. The processor 1602c of each of the ground monitoring stations 1602 retrieves the instructions defined by the navigation data extraction module 1602a and the navigation data relay module 1602b, and executes the instructions, thereby performing one or more processes defined by those instructions.

The ground master control station 1603 comprises modules 1603a, 1603b, and 1603c executable by at least one processor 1603d. The ground master control station 1603 comprises a data collation module 1603a, a navigation data structure generation module 1603b, and a data transmission module 1603c. The data collation module 1603a defines instructions for collating the relayed primary navigation data from each of the ground monitoring stations 1602 to create a list of satellites visible over a predetermined geographical location. The data collation module 1603a defines instructions for determining selective ephemeris data from the relayed primary navigation data transmitted by the visible satellites. The navigation data structure generation module 1603b defines instructions for generating a navigation data structure configured to accommodate the selective ephemeris data. The data transmission module 1603c defines instructions for transmitting the selective ephemeris data in the generated navigation data structure to the geosynchronous satellites 1601a of the integrated satellite constellation system 1601 over the third carrier frequency. The navigation signal reception unit 1604 of the satellite navigation receiver 800 parallelly receives the selective ephemeris data from the geosynchronous satellites 1601a of the integrated satellite constellation system 1601 in reduced time, thereby reducing the time to first fix in the satellite navigation receiver 800.

In an embodiment, the navigation data structure generation module 1603b of the ground master control station 1603 defines instructions for generating the navigation data structure comprising a first sub-frame, a second sub-frame, and a third sub-frame configured to selectively accommodate the ephemeris data and clock parameters extracted from the collated navigation data. The data transmission module 1603c of the ground master control station 1603 defines instructions for parallelly transmitting the ephemeris data and the clock parameters in the first sub-frame, the second sub-frame, and the third sub-frame of the generated navigation data structure to the geosynchronous satellites 1601a of the integrated satellite constellation system 1601 over the third carrier frequency. The processor 1603d of the ground master control station 1603 retrieves the instructions defined by the data collation module 1603a, the navigation data structure generation module 1603b, and the data transmission module 1603c, and executes the instructions, thereby performing one or more processes defined by those instructions.

In an embodiment, the navigation signal reception unit 1604 of the satellite navigation receiver 800 parallelly receives the ephemeris data and the clock parameters from the geosynchronous satellites 1601a of the integrated satellite constellation system 1601 in reduced time, thereby reducing the time to first fix in the satellite navigation receiver 800. In another embodiment, the navigation signal reception unit 1604 of the satellite navigation receiver 800 operating in a restricted mode receives the navigation signals transmitted over a dedicated carrier frequency by the geostationary satellites 1601b of the integrated satellite constellation system 1601. The navigation signal reception unit 1604 of the satellite navigation receiver 800 operating in a restricted mode receives the navigation signals transmitted over the first carrier frequency and the second carrier frequency by the geosynchronous satellites 1601a of the integrated satellite constellation system 1601. The navigation signal reception unit 1604 of the satellite navigation receiver 800 operating in a restricted mode acquires the ephemeris data from the navigation signals transmitted over the dedicated carrier frequency, and the almanac data, the UTC data, the ionospheric data, and the clock parameters from the navigation signals transmitted over the first carrier frequency and the second carrier frequency in reduced time, thereby reducing the time to first fix in the satellite navigation receiver 800. The navigation signals transmitted over the dedicated carrier frequency are configured for a predetermined frequency and predetermined signal strength.

The satellite navigation receiver 800 further comprises a graphical user interface (GUI) 1610 configured to profile navigation data measurements, the status of reception of the navigation data, health parameters of a satellite being tracked, etc. The GUI 1610, for example, displays individual satellite identifiers, acquisition and tracking status with reference to the collection of the navigation data, the constellation number, position coordinates of the satellite with reference to the earth-centered, earth-fixed (ECEF) coordinate system, a geographical position of a user, that is, the latitude, longitude, and altitude of the user, the time to first fix (TTFF), the geographical position of the user such as the latitude, longitude, and altitude of the user, etc. The position computation module 1609 processes the extracted navigation data for computing, for example, a geometric position of each satellite and estimating a geographical position of a user based on the processed navigation data in reduced time. The position computation module 1609 comprises a satellite position computation module 1609a and a user position computation module 1609b. The satellite position computation module 1609a defines instructions for processing the extracted navigation data for computing the position of the satellite based on the processed navigation data. The satellite position computation module 1609a further defines instructions for computing the geometric range and range-rate of each satellite. The user position computation module 1609b defines instructions for estimating a geographical position of a user, that is, latitude, longitude, altitude, etc., of the user, for example, by applying a standard global positioning system (GPS) based triangulation algorithm.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method for reducing time to first fix in a satellite navigation receiver, comprising:
    constructing an integrated satellite constellation system configured to transmit navigation signals comprising navigation data over a combination of a first carrier frequency, a second carrier frequency, and a third carrier frequency, said construction comprising:
        positioning a predetermined number of geosynchronous satellites operating in said first carrier frequency and said second carrier frequency at first predetermined geographic coordinates in a geosynchronous orbit; and
        positioning a predetermined number of geostationary satellites operating in said third carrier frequency at second predetermined geographic coordinates in a geostationary orbit among said predetermined number of said geosynchronous satellites; and
    parallelly transmitting sub-frames of said navigation data to said satellite navigation receiver by said constructed integrated satellite constellation system over said combination of said first carrier frequency, said second carrier frequency, and said third carrier frequency in reduced time, thereby reducing said time to first fix in said satellite navigation receiver.

2. A method for reducing time to first fix in a satellite navigation receiver, comprising:
    parallelly receiving a plurality of navigation signals from a plurality of satellites of an integrated satellite constellation system by a satellite navigation receiver via a plurality of input channels, wherein each of said navigation signals comprises sub-frames configured to selectively accommodate navigation data, and wherein said satellite navigation receiver is configured to receive each of said sub-frames of said navigation data via one of said input channels; and
    extracting ephemeris data, ionospheric data, coordinated universal time data, and textual data from said sub-frames of said navigation data of said each of said navigation signals by said satellite navigation receiver, wherein said ephemeris data is extracted from said navigation signals transmitted over a third carrier frequency, and wherein said ionospheric data, said coordinated universal time data, and said textual data are extracted from said navigation signals transmitted over a first carrier frequency and a second carrier frequency;
whereby parallel acquisition of said ephemeris data, said ionospheric data, said coordinated universal time data, and said textual data over said first carrier frequency, said second carrier frequency, and said third carrier frequency by said satellite navigation receiver reduces said time to first fix in said satellite navigation receiver.

3. The method of claim 2, wherein said integrated satellite constellation system is constructed by:
    positioning a predetermined number of geosynchronous satellites operating in said first carrier frequency and said second carrier frequency at first predetermined geographic coordinates in a geosynchronous orbit; and
    positioning a predetermined number of geostationary satellites operating in said third carrier frequency at second predetermined geographic coordinates in a geostationary orbit among said predetermined number of said geosynchronous satellites.

4. A method for reducing time to first fix in a satellite navigation receiver, comprising:
    receiving primary navigation signals transmitted by a plurality of satellites of a constellation over a first carrier frequency and a second carrier frequency, by a plurality of ground monitoring stations;
    extracting primary navigation data comprising ephemeris data from said received primary navigation signals by said ground monitoring stations;
    relaying said extracted primary navigation data to a ground master control station by said ground monitoring stations;
    collating said relayed primary navigation data from said ground monitoring stations by said ground master control station to create a list of said satellites visible over a predetermined geographical location;
    determining selective ephemeris data from said relayed primary navigation data transmitted by said visible satellites, by said ground master control station;
    generating a navigation data structure configured to accommodate said selective ephemeris data by said ground master control station;
    transmitting said selective ephemeris data in said generated navigation data structure to geosynchronous satellites of an integrated satellite constellation system over a third carrier frequency by said ground master control station; and
    parallelly receiving said selective ephemeris data from said geosynchronous satellites of said integrated satellite constellation system by said satellite navigation receiver in reduced time, thereby reducing said time to first fix in said satellite navigation receiver.

5. The method of claim 4, wherein said integrated satellite constellation system is constructed by:
    positioning a predetermined number of said geosynchronous satellites operating in said first carrier frequency and said second carrier frequency at first predetermined geographic coordinates in a geosynchronous orbit; and
    positioning a predetermined number of geostationary satellites operating in said third carrier frequency at second predetermined geographic coordinates in a geostationary orbit among said predetermined number of said geosynchronous satellites.

6. A method for reducing time to first fix in a satellite navigation receiver, comprising:
    receiving navigation signals transmitted by a plurality of satellites of a constellation over a first carrier frequency, a second carrier frequency, and a third carrier frequency by said satellite navigation receiver via a plurality of input channels, wherein each of said navigation signals is configured to accommodate navigation data comprising ephemeris data and time of week data;
    extracting ephemeris data from said received navigation signals over said third carrier frequency by said satellite navigation receiver by locking said input channels operating at said first carrier frequency and said second carrier frequency; and acquiring said time of week data from said satellites by said satellite navigation receiver over said first carrier frequency and said second carrier frequency;

whereby said extraction of said ephemeris data over said third carrier frequency and said acquisition of said time of week data over said first carrier frequency and said second carrier frequency reduce said time to first fix in said satellite navigation receiver.

7. A method for reducing time to first fix in a satellite navigation receiver, comprising:

receiving a plurality of navigation signals transmitted by a plurality of satellites of a constellation over a first carrier frequency and a second carrier frequency, by a plurality of ground monitoring stations;

extracting navigation data from said received navigation signals by said ground monitoring stations;

relaying said extracted navigation data to a ground master control station by said ground monitoring stations;

collating said relayed navigation data from said ground monitoring stations by said ground master control station to create a list of said satellites visible over a predetermined geographical location;

generating a navigation data structure comprising a first sub-frame, a second sub-frame, and a third sub-frame configured to selectively accommodate ephemeris data and clock parameters extracted from said collated navigation data by said ground master control station;

parallelly transmitting said ephemeris data and said clock parameters in said first sub-frame, said second sub-frame, and said third sub-frame of said generated navigation data structure to geosynchronous satellites of an integrated satellite constellation system over a third carrier frequency by said ground master control station; and parallelly receiving said ephemeris data and said clock parameters from said geosynchronous satellites of said integrated satellite constellation system by said satellite navigation receiver in reduced time, thereby reducing said time to first fix in said satellite navigation receiver.

8. A method for reducing time to first fix in a satellite navigation receiver, comprising:

receiving navigation signals transmitted over a dedicated carrier frequency by geostationary satellites of an integrated satellite constellation system by said satellite navigation receiver, wherein said satellite navigation receiver is operating in a restricted mode;

receiving navigation signals transmitted over a first carrier frequency and a second carrier frequency by geosynchronous satellites of said integrated satellite constellation by said satellite navigation receiver; and acquiring ephemeris data from said navigation signals transmitted over said dedicated carrier frequency, and almanac data, coordinated universal time data, ionospheric data, and clock parameters from said navigation signals transmitted over said first carrier frequency and said second carrier frequency by said satellite navigation receiver in reduced time, thereby reducing said time to first fix in said satellite navigation receiver.

9. The method of claim 8, wherein said navigation signals transmitted over said dedicated carrier frequency are configured for a predetermined frequency and a predetermined signal strength.

10. A method for reducing time to first fix in a satellite navigation receiver, comprising:

acquiring time of week data from first navigation signals transmitted over a third carrier frequency by said satellite navigation receiver;

acquiring a restricted signal transmitted over a dedicated carrier frequency based on said acquired time of week data by said satellite navigation receiver; and acquiring ephemeris data from second navigation signals transmitted over said dedicated carrier frequency, and almanac data, ionospheric data, and clock parameters from third navigation signals transmitted over a first carrier frequency and a second carrier frequency by said satellite navigation receiver in reduced time, thereby reducing said time to first fix in said satellite navigation receiver.

11. A system for reducing time to first fix in a satellite navigation receiver, comprising:

an integrated satellite constellation system configured to transmit navigation signals comprising navigation data over a combination of a first carrier frequency, a second carrier frequency, and a third carrier frequency, said integrated satellite constellation system comprising:

a predetermined number of geosynchronous satellites operating in said first carrier frequency and said second carrier frequency and positioned at first predetermined geographic coordinates in a geosynchronous orbit;

a predetermined number of geostationary satellites operating in said third carrier frequency and positioned at second predetermined geographic coordinates in a geostationary orbit among said predetermined number of said geosynchronous satellites; and a navigation data transmission unit configured to parallelly transmit sub-frames of said navigation data to said satellite navigation receiver over said combination of said first carrier frequency, said second carrier frequency, and said third carrier frequency in reduced time, thereby reducing said time to first fix in said satellite navigation receiver; and said satellite navigation receiver comprising:

a navigation signal reception unit configured to parallelly receive said navigation signals from said integrated satellite constellation system via a plurality of input channels, wherein said navigation signal reception unit is configured to receive each of said sub-frames of said navigation data from said navigation signals via one of said input channels;

at least one first processor configured to execute modules of said satellite navigation receiver;

a non-transitory computer readable storage medium communicatively coupled to said at least one first processor, said non-transitory computer readable storage medium configured to store said modules of said satellite navigation receiver; and said modules of said satellite navigation receiver comprising:

a data extraction module configured to extract ephemeris data, ionospheric data, coordinated universal time data, and textual data from said sub-frames of said navigation data of each of said navigation signals, wherein said data extraction module is configured to extract said ephemeris data from said navigation signals transmitted over said third carrier frequency, and wherein said data extraction module is configured to extract said ionospheric data, said coordinated universal time data, and said textual data from said navigation signals transmitted over said first carrier frequency and said second carrier frequency;
said navigation signal reception unit further configured to parallelly acquire said ephemeris data, said ionospheric data, said coordinated universal time data, and said textual data over said first carrier frequency, said second carrier frequency, and said third carrier frequency, thereby reducing said time to first fix in said satellite navigation receiver.

12. The system of claim 11, wherein said navigation signal reception unit of said satellite navigation receiver is further configured to receive said navigation signals transmitted by a plurality of satellites of a constellation over said first carrier frequency, said second carrier frequency, and said third carrier frequency via said input channels, wherein said each of said navigation signals is configured to accommodate said navigation data comprising said ephemeris data and time of week data.

13. The system of claim 12, wherein said data extraction module of said satellite navigation receiver is further configured to extract said ephemeris data from said received navigation signals over said third carrier frequency by locking said input channels operating at said first carrier frequency and said second carrier frequency.

14. The system of claim 12, wherein said navigation signal reception unit of said satellite navigation receiver is further configured to acquire said time of week data from said satellites over said first carrier frequency and said second carrier frequency.

15. The system of claim 11, further comprising:
a plurality of ground monitoring stations configured to receive primary navigation signals transmitted by a plurality of satellites of a constellation over said first carrier frequency and said second carrier frequency, said ground monitoring stations comprising modules executable by at least one second processor, said modules of said ground monitoring stations comprising:
a navigation data extraction module configured to extract primary navigation data comprising said ephemeris data from said received primary navigation signals; and
a navigation data relay module configured to relay said extracted primary navigation data to a ground master control station;
said ground master control station comprising modules executable by at least one third processor, said modules of said ground master control station comprising:
a data collation module configured to collate said relayed primary navigation data from said ground monitoring stations to create a list of said satellites visible over a predetermined geographical location;
said data collation module configured to determine selective ephemeris data from said relayed primary navigation data transmitted by said visible satellites;
a navigation data structure generation module configured to generate a navigation data structure, said navigation data structure configured to accommodate said selective ephemeris data; and
a data transmission module configured to transmit said selective ephemeris data in said generated navigation data structure to said geosynchronous satellites of said integrated satellite constellation system over said third carrier frequency; and
said navigation signal reception unit of said satellite navigation receiver further configured to parallelly receive said selective ephemeris data from said geosynchronous satellites of said integrated satellite constellation system in reduced time, thereby reducing said time to first fix in said satellite navigation receiver.

16. The system of claim 15, wherein said navigation data structure generation module of said ground master control station is further configured to generate said navigation data structure comprising a first sub-frame, a second sub-frame, and a third sub-frame configured to selectively accommodate said ephemeris data and clock parameters extracted from said collated navigation data.

17. The system of claim 16, wherein said data transmission module of said ground master control station is further configured to parallelly transmit said ephemeris data and said clock parameters in said first sub-frame, said second sub-frame, and said third sub-frame of said generated navigation data structure to said geosynchronous satellites of said integrated satellite constellation system over said third carrier frequency.

18. The system of claim 17, wherein said navigation signal reception unit of said satellite navigation receiver is further configured to parallelly receive said ephemeris data and said clock parameters from said geosynchronous satellites of said integrated satellite constellation system in reduced time, thereby reducing said time to first fix in said satellite navigation receiver.

19. The system of claim 11, wherein said navigation signal reception unit of said satellite navigation receiver is further configured to perform:
receiving said navigation signals transmitted over a dedicated carrier frequency by said geostationary satellites of said integrated satellite constellation system, wherein said satellite navigation receiver is operating in a restricted mode;
receiving said navigation signals transmitted over said first carrier frequency and said second carrier frequency by said geosynchronous satellites of said integrated satellite constellation; and
acquiring said ephemeris data from said navigation signals transmitted over said dedicated carrier frequency, and almanac data, said coordinated universal time data, said ionospheric data, and clock parameters from said navigation signals transmitted over said first carrier frequency and said second carrier frequency in reduced time, thereby reducing said time to first fix in said satellite navigation receiver.

20. The system of claim 19, wherein said navigation signals transmitted over said dedicated carrier frequency are configured for a predetermined frequency and a predetermined signal strength.

21. The system of claim 11, wherein said data extraction module of said satellite navigation receiver is further configured to perform:
acquiring time of week data from first navigation signals transmitted over said third carrier frequency;
acquiring a restricted signal transmitted over a dedicated carrier frequency based on said acquired time of week data; and
acquiring said ephemeris data from second navigation signals transmitted over said dedicated carrier frequency, and almanac data, said ionospheric data, and clock parameters from third navigation signals transmitted over said first carrier frequency and said second carrier frequency in reduced time, thereby reducing said time to first fix in said satellite navigation receiver.

* * * * *